(12) United States Patent
Nakagawa et al.

(10) Patent No.: US 10,087,864 B2
(45) Date of Patent: Oct. 2, 2018

(54) CONTROL DEVICE OF INTERNAL COMBUSTION ENGINE

(71) Applicant: TOYOTA JIDOSHA KABUSHIKI KAISHA, Toyota-shi, Aichi (JP)

(72) Inventors: Norihisa Nakagawa, Susono (JP); Shuntaro Okazaki, Sunto-gun (JP); Yuji Yamaguchi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 15/108,735

(22) PCT Filed: Apr. 22, 2015

(86) PCT No.: PCT/JP2015/002197
§ 371 (c)(1),
(2) Date: Jun. 28, 2016

(87) PCT Pub. No.: WO2015/162925
PCT Pub. Date: Oct. 29, 2015

(65) Prior Publication Data
US 2017/0037804 A1    Feb. 9, 2017

(30) Foreign Application Priority Data

Apr. 25, 2014   (JP) ................. 2014-091790

(51) Int. Cl.
*F01N 11/00* (2006.01)
*F01N 3/10* (2006.01)
(Continued)

(52) U.S. Cl.
CPC ....... *F02D 41/1454* (2013.01); *F01N 3/0864* (2013.01); *F01N 3/101* (2013.01);
(Continued)

(58) Field of Classification Search
CPC .. F01N 11/007; F01N 13/0093; F01N 3/0864; F01N 3/101; F01N 9/00;
(Continued)

(56) References Cited

U.S. PATENT DOCUMENTS

| 2003/0017603 | A1* | 1/2003 | Uchida | B01D 53/9495 436/37 |
|---|---|---|---|---|
| 2005/0120710 | A1 | 6/2005 | Yoshioka | |
| 2016/0061084 | A1 | 3/2016 | Okazaki et al. | |

FOREIGN PATENT DOCUMENTS

| JP | 2001-105931 A | 4/2001 |
|---|---|---|
| JP | 2005-163734 A | 6/2005 |

(Continued)

*Primary Examiner* — Brandon Lee
(74) *Attorney, Agent, or Firm* — Oliff PLC

(57) ABSTRACT

An internal combustion engine includes an upstream side exhaust purification catalyst and a downstream side exhaust purification catalyst. The control device includes a storage amount estimating device which estimates the oxygen storage amount of the downstream side exhaust purification catalyst, and can execute fuel cut control which cuts the feed of fuel to the combustion chamber during operation of the internal combustion engine when the engine speed is the lowest reference speed or more. The control device lowers the lowest reference speed when the storage amount estimated by the storage amount estimating device has become a given limit storage amount or less, compared with when it is larger than the limit storage amount. As a result, a control device can effectively keep the oxygen storage amount of the downstream side exhaust purification catalyst from decreasing to zero.

9 Claims, 10 Drawing Sheets

(51) Int. Cl.
  *F01N 9/00* (2006.01)
  *F02D 41/14* (2006.01)
  *F02D 41/30* (2006.01)
  *F02D 41/02* (2006.01)
  *F02D 41/12* (2006.01)
  *F01N 13/00* (2010.01)
  *F01N 3/08* (2006.01)

(52) U.S. Cl.
  CPC .............. *F01N 9/00* (2013.01); *F01N 11/007* (2013.01); *F01N 13/0093* (2014.06); *F02D 41/0295* (2013.01); *F02D 41/123* (2013.01); *F02D 41/3005* (2013.01); *F01N 2570/00* (2013.01); *F01N 2570/16* (2013.01); *F01N 2900/1402* (2013.01); *F01N 2900/1624* (2013.01); *F02D 2200/0814* (2013.01); *F02D 2200/0816* (2013.01); *Y02T 10/22* (2013.01); *Y02T 10/47* (2013.01)

(58) Field of Classification Search
  CPC ............. F01N 2570/00; F01N 2570/16; F01N 2900/1402; F01N 2900/1624; F02D 41/0295; F02D 41/123; F02D 41/1454; F02D 41/3005; F02D 2200/0814; F02D 2200/0816; Y02T 10/22; Y02T 10/47
  See application file for complete search history.

(56) References Cited

FOREIGN PATENT DOCUMENTS

| | | |
|---|---|---|
| JP | 2005-307853 A | 11/2005 |
| JP | 2011-069337 A | 4/2011 |
| WO | 2014/118892 A1 | 8/2014 |

\* cited by examiner (A)

(B)

CONTROL DEVICE OF INTERNAL COMBUSTION ENGINE

TECHNICAL FIELD

The present invention relates to a control device of an internal combustion engine.

BACKGROUND ART

In the past, there has been widely known an internal combustion engine which is provided with an upstream side exhaust purification catalyst in an exhaust passage of an internal combustion engine and is provided with a downstream side exhaust purification catalyst in the exhaust passage at the downstream side in the direction of flow of exhaust with respect to the upstream side exhaust purification catalyst (for example, see PTL 1). In this internal combustion engine, the unburned gas (unburned HC, CO, etc.) or NOx, etc., which is not removed by the upstream side exhaust purification catalyst is removed by the downstream side exhaust purification catalyst. As a result, it becomes possible to suitably remove the unburned gas and $NO_x$ in the exhaust gas which is exhausted from the internal combustion engine.

For example, in the device which is described in PTL 1, when the output voltage of the downstream side oxygen sensor is at the high side threshold value or more and the state of the upstream side exhaust purification catalyst is an oxygen deficient state, the target air-fuel ratio of the exhaust gas flowing into the upstream side exhaust purification catalyst is made a lean air-fuel ratio. Conversely, when the output voltage of the oxygen sensor at the downstream side is at the low side threshold value or less and the state of the upstream side exhaust purification catalyst is the oxygen excess state, the target air-fuel ratio is made the rich air-fuel ratio. According to PTL 1, it is considered that due to this, when in an oxygen deficient state or oxygen excess state, it is possible to return the state of the catalyst quickly to a state between these two states (that is, state in which catalyst stores suitable amount of oxygen).

Further, when the output voltage of the downstream side oxygen sensor is at the low side threshold value or less, exhaust gas of an air-fuel ratio leaner than the stoichiometric air-fuel ratio (hereinafter referred to as "lean air-fuel ratio") flows out from the upstream side exhaust purification catalyst. Therefore, in this case, exhaust gas which contains $NO_x$ flows out from the upstream side exhaust purification catalyst. On the other hand, when the output voltage of the downstream side oxygen sensor is at the high side threshold value or more, exhaust gas of an air-fuel ratio richer than the stoichiometric air-fuel ratio (below, referred to as "rich air-fuel ratio") flows out from the upstream side exhaust purification catalyst. Therefore, in this case, exhaust gas containing unburned gas flows out from the upstream side exhaust purification catalyst. When in this way exhaust gas containing $NO_x$ or unburned gas flows out from the upstream side exhaust purification catalyst, these components in the exhaust gas are removed at the downstream side exhaust purification catalyst.

CITATION LIST

Patent Literature

PTL 1: Japanese Patent Publication No. 2011-069337A
PTL 2: Japanese Patent Publication No. 2005-307853A
PTL 3: Japanese Patent Publication No. 2001-105931A

SUMMARY OF INVENTION

Technical Problem

In the meantime, in the downstream side exhaust purification catalyst, even if the air-fuel ratio of the inflowing exhaust gas is a lean air-fuel ratio, the oxygen in the exhaust gas cannot necessarily be stored in the downstream side exhaust purification catalyst. For this reason, even if making the air-fuel ratio of the exhaust gas flowing into the upstream side exhaust purification catalyst a lean air-fuel ratio and making lean air-fuel ratio exhaust gas flow out from the upstream side exhaust purification catalyst, sometimes the oxygen storage amount of the downstream side exhaust purification catalyst cannot increase.

In this way, if the oxygen storage amount of the downstream side exhaust purification catalyst cannot increase, finally the oxygen storage amount of the downstream side exhaust purification catalyst reaches substantially zero. In this case, even if rich air-fuel ratio exhaust gas temporarily flows out from the upstream side exhaust purification catalyst, the unburned gas in the exhaust gas cannot be sufficiently removed.

Therefore, in consideration of the above problem, an object of the present invention is to provide a control device of an internal combustion engine which can effectively keep the oxygen storage amount of the downstream side exhaust purification catalyst from being decreased to zero.

Solution to Problem

To solve this problem, in a first aspect of the invention, there is provided a control device of an internal combustion engine, the engine comprising an upstream side exhaust purification catalyst which is provided in an exhaust passage of an internal combustion engine and a downstream side exhaust purification catalyst which is provided in the exhaust passage at the downstream side in the direction of exhaust flow of the upstream side exhaust purification catalyst, the control device comprising a storage amount estimating means for estimating the oxygen storage amount of the downstream side exhaust purification catalyst, when conditions for execution of a fuel cut, including the engine speed being a lowest reference speed or more, stand, fuel cut control which cuts the feed of fuel to the combustion chamber during operation of the internal combustion engine can be executed, and when a storage amount estimated by the storage amount estimating means becomes a given limit storage amount or less, the lowest reference speed of the fuel cut execution conditions is lowered compared to when it is greater than the limit storage amount.

In a second aspect of the invention, there is provided the first aspect of the invention, further comprising a downstream side air-fuel ratio sensor which is provided at the downstream side in the direction of flow of exhaust from the upstream side exhaust purification catalyst and at the upstream side in the direction of flow of exhaust from the downstream side exhaust purification catalyst, wherein the storage amount estimating means estimate the oxygen storage amount of the downstream the exhaust purification catalyst based on the output of the downstream side air-fuel ratio sensor.

In a third aspect of the invention, there is provided the first aspect of the invention, wherein the storage amount estimating means estimates that the oxygen storage amount of the downstream side exhaust purification catalyst has become the limit storage amount or less when a cumulative intake air amount from when the previous fuel cut control ends has become a limit air amount or less.

In a fourth aspect of the invention, there is provided any one of the first to third aspects of the invention, further comprising a downstream side air-fuel ratio sensor which is provided at the downstream side in the direction of flow of exhaust from the upstream side exhaust purification catalyst and at the upstream side in the direction of flow of exhaust from the downstream side exhaust purification catalyst, the control device performs feedback control so that the air-fuel ratio of the exhaust gas flowing into the upstream side exhaust purification catalyst becomes a target air-fuel ratio and performs target air-fuel ratio setting control which alternately sets the target air-fuel ratio to a rich set air-fuel ratio which is richer than the stoichiometric air-fuel ratio and a lean set air-fuel ratio which is leaner than the stoichiometric air-fuel ratio, and, in the target air-fuel ratio setting control, when the air-fuel ratio detected by the downstream side air-fuel ratio sensor has become a rich judgment air-fuel ratio, which is richer than the stoichiometric air-fuel ratio, or less, the target air-fuel ratio is switched to the lean set air-fuel ratio.

In a fifth aspect of the invention, there is provided the second aspect of the invention, wherein the control device performs feedback control so that the air-fuel ratio of the exhaust gas flowing into the upstream side exhaust purification catalyst becomes a target air-fuel ratio and performs target air-fuel ratio setting control which alternately sets the target air-fuel ratio to a rich set air-fuel ratio which is richer than the stoichiometric air-fuel ratio and a lean set air-fuel ratio which is leaner than the stoichiometric air-fuel ratio, and, in the target air-fuel ratio setting control, when the air-fuel ratio detected by the downstream side air-fuel ratio sensor has become a rich judgment air-fuel ratio, which is richer than the stoichiometric air-fuel ratio, or less, the target air-fuel ratio is switched to the lean set air-fuel ratio.

In a sixth aspect of the invention, there is provided the fourth or fifth aspect of the invention, wherein in the target air-fuel ratio setting control, when the oxygen storage amount of the upstream side exhaust purification catalyst has become a given switching reference storage amount, which is smaller than a maximum storable oxygen amount, or more, the target air-fuel ratio is switched to the rich set air-fuel ratio.

Advantageous Effects of Invention

According to the present invention, there is provided a control device of an internal combustion engine which can effectively keep the oxygen storage amount of the downstream side exhaust purification catalyst from being decreased to zero.

DESCRIPTION OF EMBODIMENTS

Figure 1:
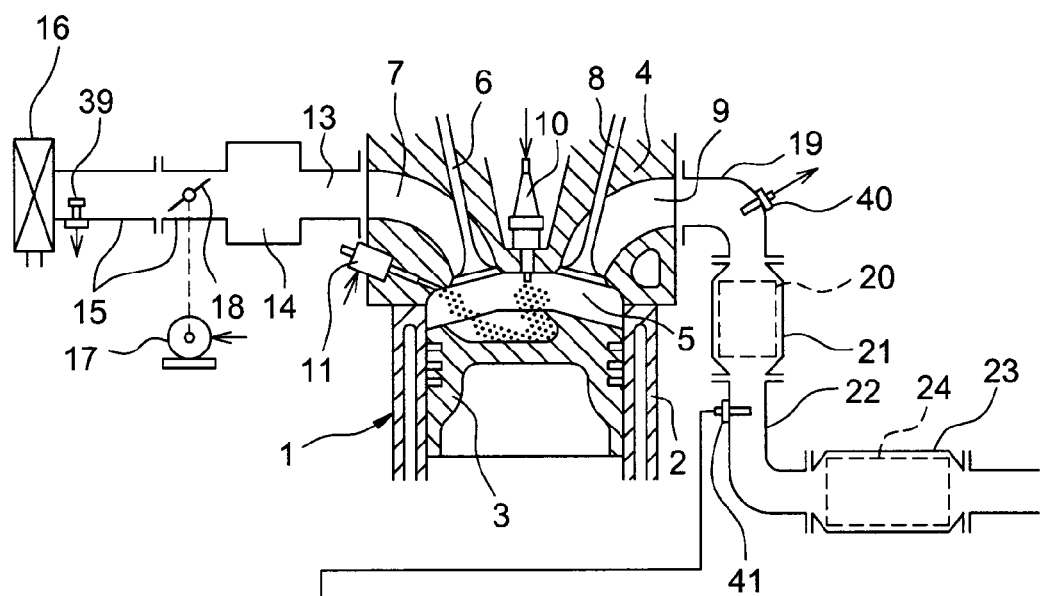
FIG. 1 is a view which schematically shows an internal combustion engine in which a control device of the present invention is used.
Figure 1:
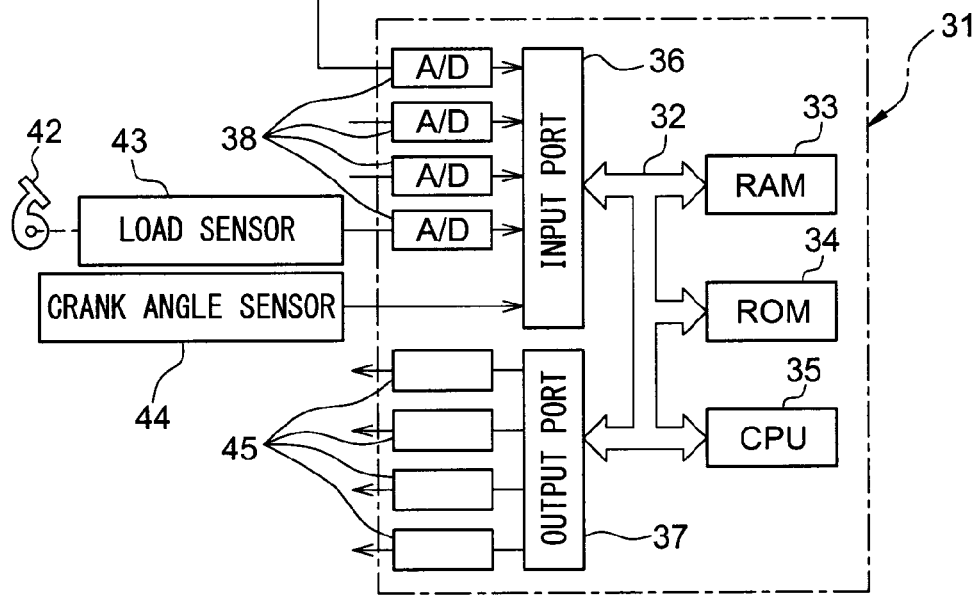

Below, referring to the drawings, embodiments of the present invention will be explained in detail. Note that, in the following explanation, similar components are assigned the same reference numerals.

<Explanation of Internal Combustion Engine as a Whole>

FIG. 1 is a view which schematically shows an internal combustion engine in which a control device according to the present invention is used. Referring to FIG. 1, 1 indicates an engine body, 2 a cylinder block, 3 a piston which reciprocates in the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a peripheral part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine of the present embodiment may also use another kind of fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a collected part at which these runners are collected. The collected part of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an airflow meter 39 is arranged for detecting the flow rate of air flowing through the intake pipe 15. The output of this airflow meter 39 is input through a corresponding AD converter 38 to the input port 36. Further, at the collected part of the exhaust manifold 19, an upstream side air-fuel ratio sensor (upstream side air-fuel ratio detecting device) 40 is arranged which detects the air-fuel ratio of the exhaust gas flowing through the inside of the exhaust manifold 19 (that is, the exhaust gas flowing into the upstream side exhaust purification catalyst 20). In addition, in the exhaust pipe 22, a downstream side air-fuel ratio sensor (downstream side air-fuel ratio detecting device) 41 is arranged which detects the air-fuel ratio of the exhaust gas flowing through the inside of the exhaust pipe 22 (that is, the exhaust gas flowing out from the upstream side exhaust purification catalyst 20 and flowing into the downstream side exhaust purification catalyst 24). The outputs of these air-fuel ratio sensors 40 and 41 are also input through the corresponding AD converters 38 to the input port 36.

Further, an accelerator pedal 42 is connected to a load sensor 43 generating an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that the ECU 31 functions as a control device for controlling the internal combustion engine.

Note that, the internal combustion engine according to the present embodiment is a non-supercharged internal combustion engine which is fueled by gasoline, but the internal combustion engine according to the present invention is not limited to the above configuration. For example, the internal combustion engine according to the present invention may have cylinder array, state of injection of fuel, configuration of intake and exhaust systems, configuration of valve mechanism, presence of supercharger, and/or supercharged state, etc. which are different from the above internal combustion engine.

<Explanation of Exhaust Purification Catalyst>

The upstream side exhaust purification catalyst 20 and downstream side exhaust purification catalyst 24 in each case have similar configurations. The exhaust purification catalysts 20 and 24 are three-way catalysts having oxygen storage abilities. Specifically, the exhaust purification catalysts 20 and 24 are formed such that on substrate consisting of ceramic, a precious metal having a catalytic action (for example, platinum (Pt)) and a substance having an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_x$) and, in addition, an oxygen storage ability, when reaching a predetermined activation temperature.

According to the oxygen storage ability of the exhaust purification catalysts 20 and 24, the exhaust purification catalysts 20 and 24 store the oxygen in the exhaust gas when the air-fuel ratio of the exhaust gas flowing into the exhaust purification catalysts 20 and 24 is leaner than the stoichiometric air-fuel ratio (lean air-fuel ratio). On the other hand, the exhaust purification catalysts 20 and 24 release the oxygen stored in the exhaust purification catalysts 20 and 24 when the air-fuel ratio of the inflowing exhaust gas is richer than the stoichiometric air-fuel ratio (rich air-fuel ratio).

Figure 2:
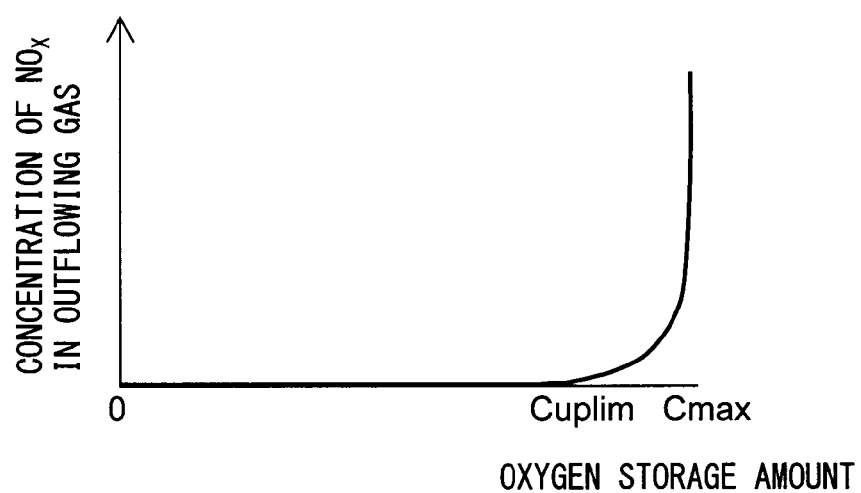
FIG. 2 is a view which shows the relationship between the stored amount of oxygen of the exhaust purification catalyst and concentration of $NO_x$ or concentration of HC or CO in the exhaust gas flowing out from the exhaust purification catalyst.
Figure 2:
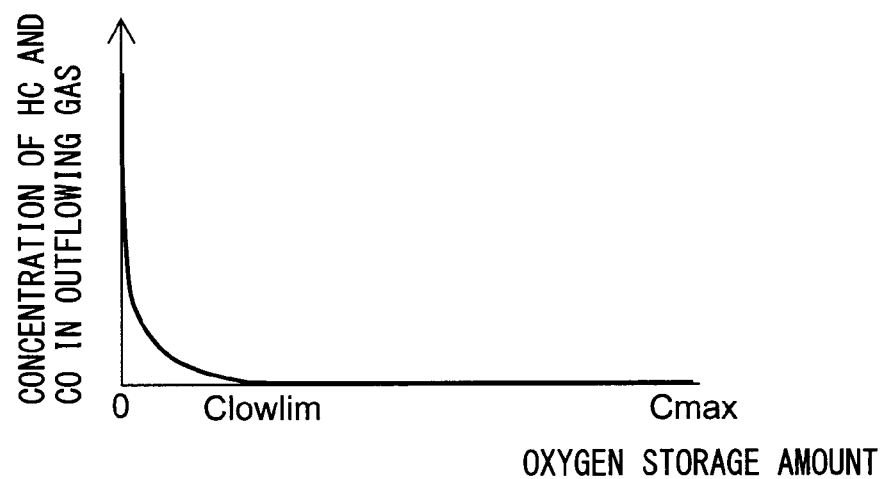

The exhaust purification catalysts 20 and 24 have a catalytic action and oxygen storage ability and thereby have the action of purifying $NO_x$ and unburned gas according to the stored amount of oxygen. That is, in the case where the air-fuel ratio of the exhaust gas flowing into the exhaust purification catalysts 20 and 24 is a lean air-fuel ratio, as shown in FIG. 2A, when the stored amount of oxygen is small, the exhaust purification catalysts 20 and 24 store the oxygen in the exhaust gas. Further, along with this, the $NO_x$ in the exhaust gas is reduced and purified. On the other hand, if the stored amount of oxygen becomes larger beyond a certain stored amount near the maximum storable oxygen amount Cmax (in the figure, Cuplim), the exhaust gas flowing out from the exhaust purification catalysts 20 and 24 rapidly rises in concentration of oxygen and $NO_x$.

On the other hand, in the case where the air-fuel ratio of the exhaust gas flowing into the exhaust purification catalysts 20 and 24 is the rich air-fuel ratio, as shown in FIG. 2B, when the stored amount of oxygen is large, the oxygen stored in the exhaust purification catalysts 20 and 24 is released, and the unburned gas in the exhaust gas is oxidized and purified. On the other hand, if the stored amount of oxygen becomes small, the exhaust gas flowing out from the exhaust purification catalysts 20 and 24 rapidly rises in concentration of unburned gas at a certain stored amount near zero (in the figure, Clowlim).

In the above way, according to the exhaust purification catalysts 20 and 24 used in the present embodiment, the purification characteristics of $NO_x$ and unburned gas in the exhaust gas change depending on the air-fuel ratio and stored amount of oxygen of the exhaust gas flowing into the exhaust purification catalysts 20 and 24. Note that, if having a catalytic action and oxygen storage ability, the exhaust purification catalysts 20 and 24 may also be catalysts different from three-way catalysts.

<Output Characteristic of Air-Fuel Ratio Sensor>

Figure 3:
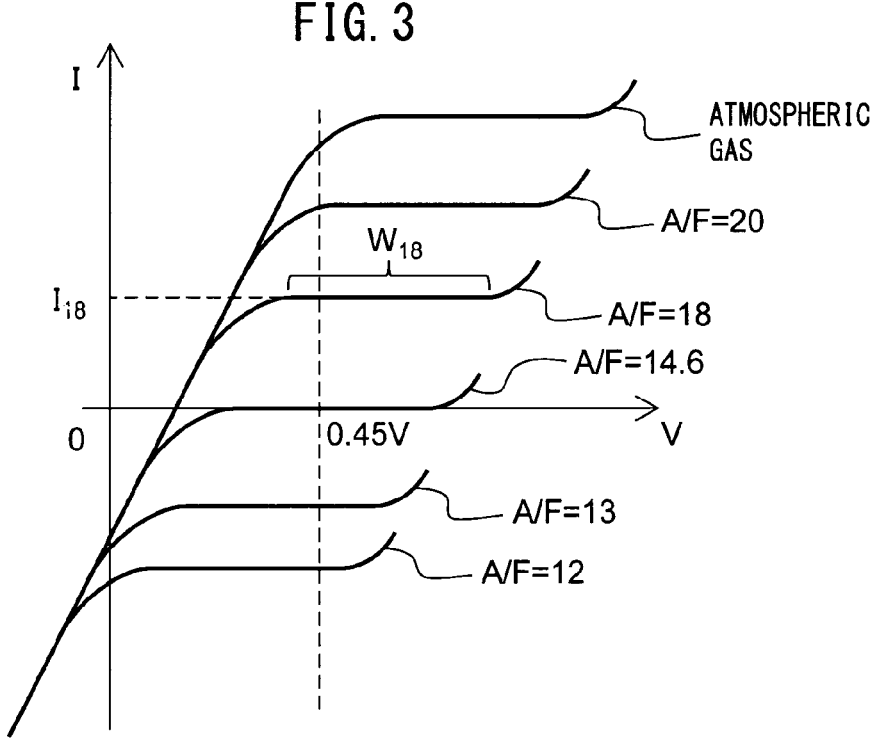
FIG. 3 is a view which shows the relationship between the voltage supplied to the sensor and output current at different exhaust air-fuel ratios.
Figure 4:
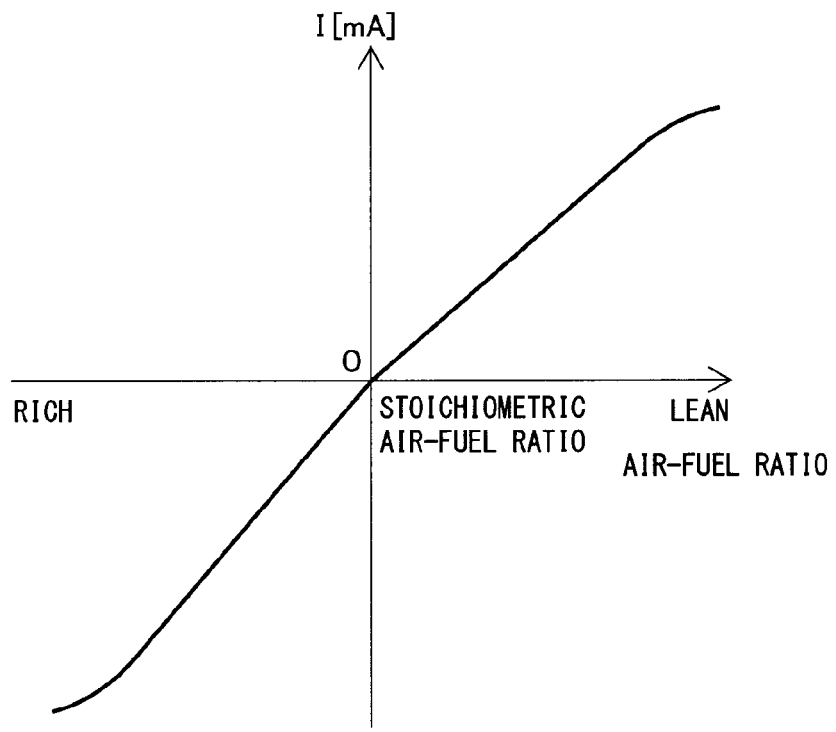
FIG. 4 is a view which shows the relationship between the exhaust air-fuel ratio and output current when making the voltage supplied to the sensor constant.

Next, referring to FIGS. 3 and 4, the output characteristic of air-fuel ratio sensors 40 and 41 in the present embodiment will be explained. FIG. 3 is a view showing the voltage-current (V-I) characteristic of the air-fuel ratio sensors 40 and 41 of the present embodiment. FIG. 4 is a view showing the relationship between air-fuel ratio of the exhaust gas (below, referred to as "exhaust air-fuel ratio") flowing around the air-fuel ratio sensors 40 and 41 and output current I, when making the supplied voltage constant. Note that, in this embodiment, the air-fuel ratio sensor having the same configurations is used as both air-fuel ratio sensors 40 and 41.

As will be understood from FIG. 3, in the air-fuel ratio sensors 40 and 41 of the present embodiment, the output current I becomes larger the higher (the leaner) the exhaust air-fuel ratio. Further, the line V-I of each exhaust air-fuel ratio has a region substantially parallel to the V axis, that is, a region where the output current does not change much at all even if the supplied voltage of the sensor changes. This voltage region is called the "limit current region". The current at this time is called the "limit current". In FIG. 3, the limit current region and limit current when the exhaust air-fuel ratio is 18 are shown by $W_{18}$ and $I_{18}$, respectively. Therefore, the air-fuel ratio sensors 40 and 41 can be referred to as "limit current type air-fuel ratio sensors".

FIG. 4 is a view which shows the relationship between the exhaust air-fuel ratio and the output current I when making the supplied voltage constant at about 0.45V. As will be understood from FIG. 4, in the air-fuel ratio sensors 40 and 41, the output current I varies linearly (proportionally) with respect to the exhaust air-fuel ratio such that the higher (that is, the leaner) the exhaust air-fuel ratio, the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors are used. However, as the air-fuel ratio sensors 40 and 41, it is also possible to use air-fuel ratio sensor not a limit current type or any other air-fuel ratio sensor, as long as the output current varies linearly with respect to the exhaust air-fuel ratio. Further, the air-fuel ratio sensors 40 and 41 may have structures different from each other.

<Basic Air Fuel Ratio Control>

Next, an outline of the basic air-fuel ratio control in a control device of an internal combustion engine of the present embodiment will be explained. In the air-fuel ratio control of the present embodiment, the fuel feed amount from the fuel injectors 11 is controlled by feedback based on the output air-fuel ratio of the upstream side air-fuel ratio sensor 40 so that the output air-fuel ratio of the upstream side air-fuel ratio sensor 40 becomes the target air-fuel ratio. Note that, "output air-fuel ratio" means an air-fuel ratio corresponding to the output value of an air-fuel ratio sensor.

On the other hand, in the air-fuel ratio control of the present embodiment, a target air-fuel ratio setting control for setting the target air-fuel ratio is performed based on the output air-fuel ratio of the downstream side air-fuel ratio sensor 41 etc. In the target air-fuel ratio setting control, when the output air-fuel ratio of the downstream side air-fuel ratio sensor 41 becomes the rich air-fuel ratio, the target air-fuel ratio is set to the lean set air-fuel ratio. After this, it is maintained at this air-fuel ratio. In this regard, the lean set air-fuel ratio is a predetermined air-fuel ratio which is leaner by a certain extent than the stoichiometric air-fuel ratio (an air-fuel ratio serving as the center of control). For example, it is 14.65 to 20, preferably 14.65 to 18, more preferably 14.65 to 16 or so. Further, the lean set air-fuel ratio can be expressed as an air-fuel ratio obtained by adding the lean correction amount to the air-fuel ratio serving as the center of control (in the present embodiment, stoichiometric air-fuel ratio). Further, in the present embodiment, it is judged that the output air-fuel ratio of the downstream side air-fuel ratio sensor 41 becomes the rich air-fuel ratio, when the output air-fuel ratio of the downstream side air-fuel ratio sensor 41 becomes a rich judgement air-fuel ratio which is slightly richer than the stoichiometric air-fuel ratio (for example, 14.55) or less.

If the target air-fuel ratio is changed to the lean set air-fuel ratio, the oxygen excess/deficiency of the exhaust gas flowing into the upstream side exhaust purification catalyst 20 is cumulatively added. The "oxygen excess/deficiency" means the amount of oxygen which becomes excessive or the amount of oxygen which becomes deficient (amount of excess unburned gas etc.) when trying to make the air-fuel ratio of the exhaust gas flowing into the upstream side exhaust purification catalyst 20 the stoichiometric air-fuel ratio. In particular, when the target air-fuel ratio is the lean set air-fuel ratio, the exhaust gas flowing into the upstream side exhaust purification catalyst 20 becomes excessive in oxygen. This excess oxygen is stored in the upstream side exhaust purification catalyst 20. Therefore, the cumulative value of the oxygen excess/deficiency (below, also referred to as the "cumulative oxygen excess/deficiency") can be said to express the stored amount of oxygen OSAsc of the upstream side exhaust purification catalyst 20.

Note that, the oxygen excess/deficiency is calculated based on the output air-fuel ratio of the upstream side air-fuel ratio sensor 40 and the estimated value of the intake air amount to the inside of the combustion chamber 5 which is calculated based on the output of the airflow meter 39 etc. or the fuel feed amount of the fuel injector 11 etc. Specifically, the oxygen excess/deficiency OED is, for example, calculated by the following formula (1):

$$ODE=0.23*Qi*(AFup-AFR). \tag{1}$$

where 0.23 indicates the concentration of oxygen in the air, Qi indicates the amount of fuel injection, and AFup indicates the output air-fuel ratio of the upstream side air-fuel ratio sensor 40 and AFR indicates the air-fuel ratio serving as the center of control (in the present embodiment, stoichiometric air-fuel ratio).

If the cumulative oxygen excess/deficiency which is cumulative value of the thus calculated oxygen excess/deficiency becomes the predetermined switching reference value (corresponding to predetermined switching reference storage amount Cref) or more, the target air-fuel ratio which had up to then been set to the lean set air-fuel ratio is set to the rich set air-fuel ratio, then is maintained at this air-fuel ratio. The rich set air-fuel ratio is a predetermined air-fuel ratio which is a certain degree richer than the stoichiometric air-fuel ratio (air-fuel ratio serving as the center of control). For example, it is 12 to 14.58, preferably 13 to 14.57, more preferably 14 to 14.55 or so. Further, the rich set air-fuel ratio can be expressed as an air-fuel ratio obtained by subtracting the rich correction amount from the air-fuel ratio serving as the center of control (in the present embodiment, stoichiometric air-fuel ratio). Note that, in the present embodiment, the difference between the rich set air-fuel ratio and the stoichiometric air-fuel ratio (rich degree) is the difference between the lean set air-fuel ratio and the stoichiometric air-fuel ratio (lean degree) or less.

After this, when the output air-fuel ratio of the downstream side air-fuel ratio sensor 41 again becomes the rich judgment air-fuel ratio or less, the target air-fuel ratio is again set to the lean set air-fuel ratio. After this, a similar operation is repeated. In this way, in the present embodiment, the target air-fuel ratio of the exhaust gas flowing into the upstream side exhaust purification catalyst 20 is alternately set to the lean set air-fuel ratio and the rich set air-fuel ratio.

However, even if performing the control stated above, the actual oxygen storage amount of the upstream side exhaust purification catalyst 20 may reach the maximum storable oxygen amount before the cumulative oxygen excess/deficiency reaches the switching reference value. As a reason for it, the reduction of the maximum storable oxygen amount of the upstream side exhaust purification catalyst 20 or significant temporal changes in the air-fuel ratio of the exhaust gas flowing into the upstream side exhaust purification catalyst 20 can be considered. If the oxygen storage amount reaches the maximum storable oxygen amount as such, the exhaust gas of lean air-fuel ratio flows out from the upstream side exhaust purification catalyst 20. Therefore, in the present embodiment, when the output air-fuel ratio of the downstream side air-fuel ratio sensor 41 becomes lean air-fuel ratio, the target air-fuel ratio is switched to the rich set air-fuel ratio. In particular, in the present embodiment, when the output air-fuel ratio of the downstream side air-fuel ratio sensor 41 becomes a lean judgment air-fuel ratio which is slightly leaner than the stoichiometric air-fuel ratio (for example, 14.65), it is judged that the output air-fuel ratio of the downstream side air-fuel sensor 41 becomes a lean air-fuel ratio.

<Explanation of Air Fuel Ratio Control Using Time Chart>

Figure 5:
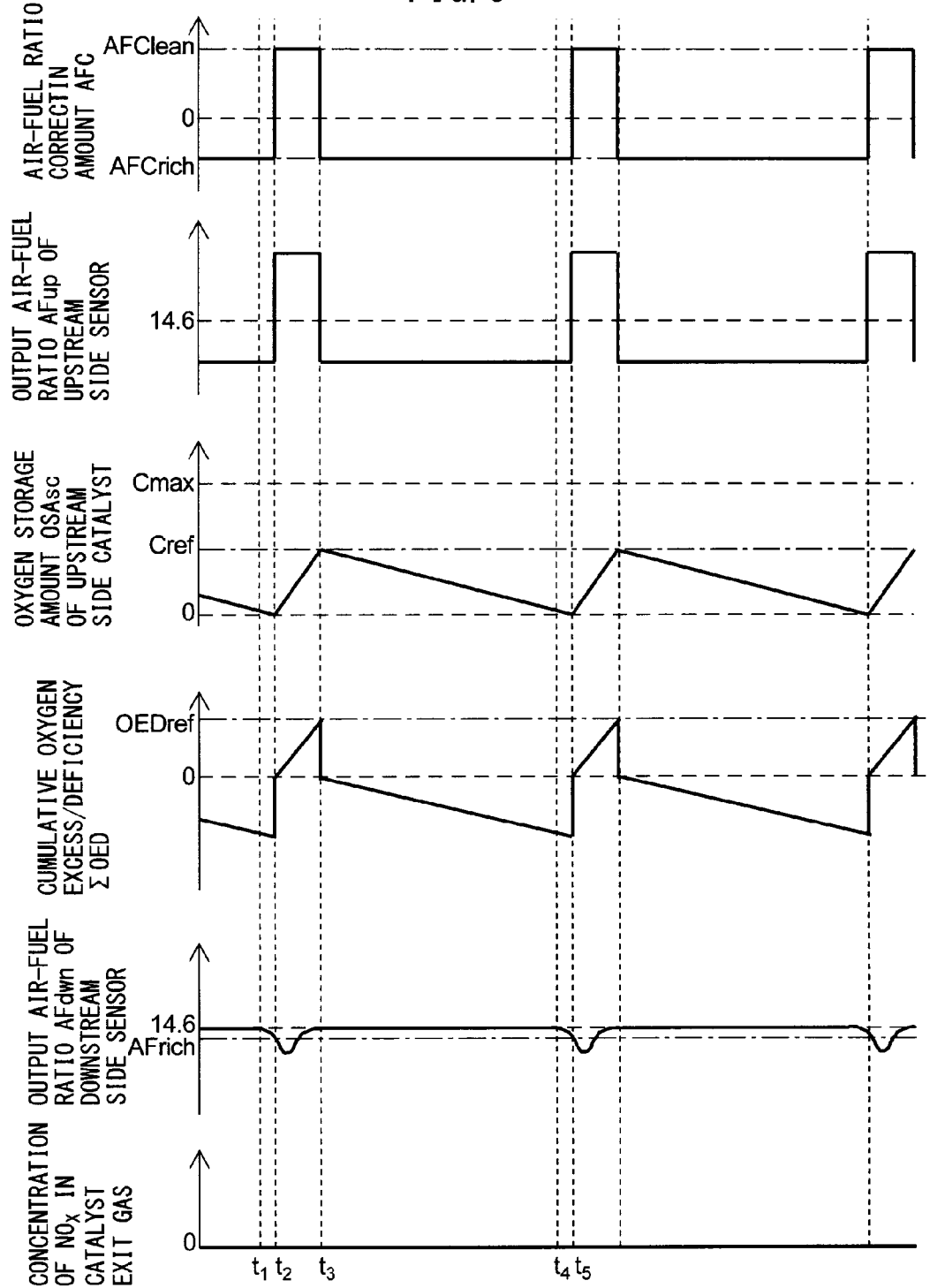
FIG. 5 is a time chart of an air-fuel ratio correction amount etc. when performing an air-fuel ratio control.
Figure 6:
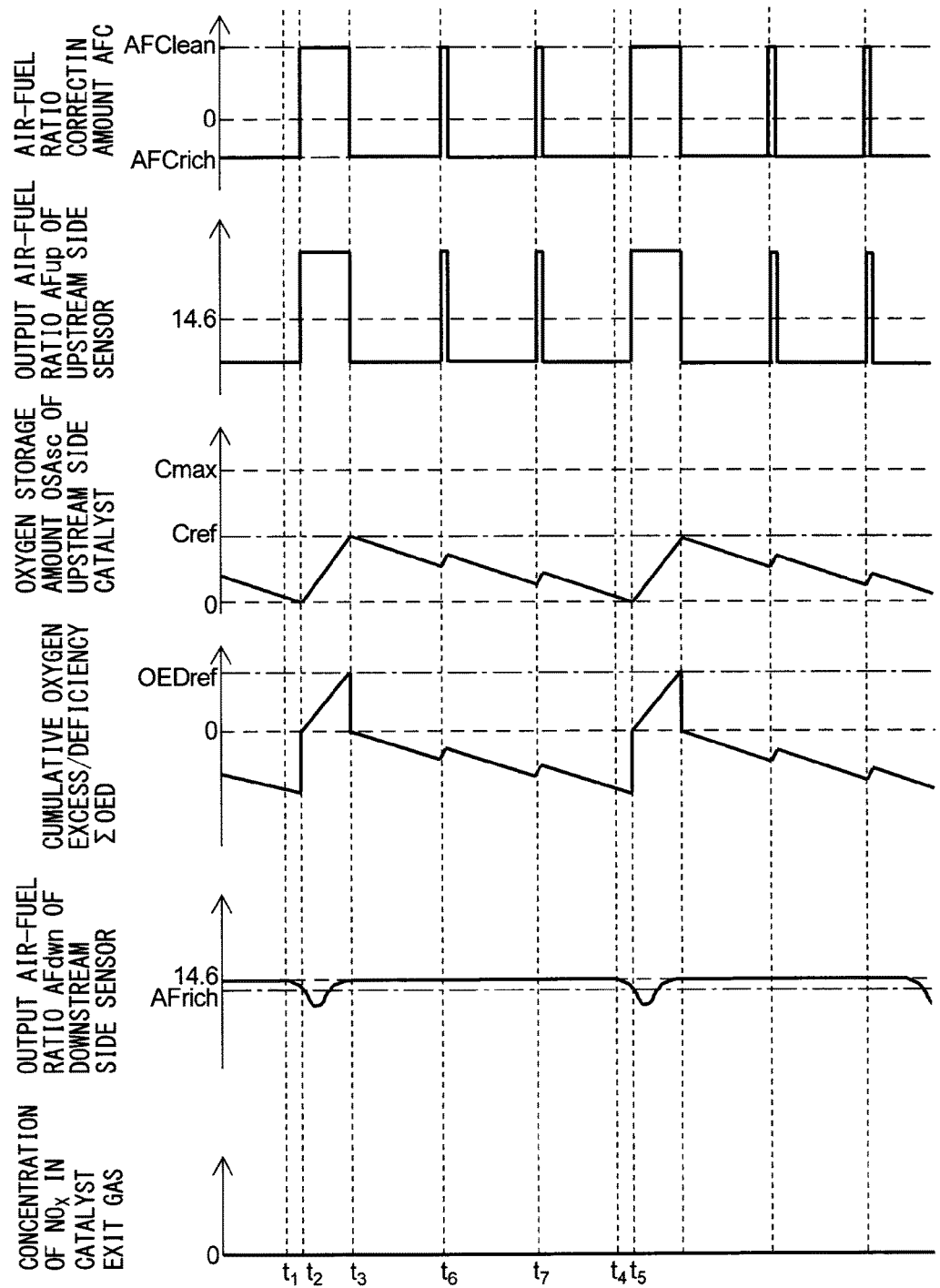
FIG. 6 is a time chart of an air-fuel ratio correction amount etc. when performing an air-fuel ratio control.

Referring to FIG. 5, the operation explained as above will be explained in detail. FIG. 5 is a time chart of the air-fuel ratio correction amount AFC, the output air-fuel ratio AFup of the upstream side air-fuel ratio sensor 40, the stored amount of oxygen OSAsc of the upstream side exhaust purification catalyst 20, the cumulative oxygen excess/deficiency ΣOED, the output air-fuel ratio AFdwn of the downstream side air-fuel ratio sensor 41, and the concentration of $NO_x$ in the exhaust gas flowing out from the upstream side exhaust purification catalyst 20, when performing the air-fuel ratio control of the present embodiment.

Note that, the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is set to the air-fuel ratio equal to the air-fuel ratio serving as center of control (below, referred to as "control center air-fuel ratio") (in this embodiment, stoichiometric air-fuel ratio). When the air-fuel ratio correction amount AFC is a positive value, the target air-fuel ratio becomes an air-fuel ratio leaner than the control center air-fuel ratio (in this embodiment, a lean air-fuel ratio), and when the air-fuel ratio correction amount AFC is a negative value, the target air-fuel ratio becomes an air-fuel ratio richer than the control center air-fuel ratio (in this embodiment, a rich air-fuel ratio).

In the illustrated example, in the state before the time $t_1$, the air-fuel correction amount AFC is set to the rich set correction amount AFCrich. That is, the target air-fuel ratio is set to a rich air-fuel ratio, and along with this, the output air-fuel ratio of the upstream side air-fuel ratio sensor 40 becomes a rich air-fuel ratio. Unburned gas contained in the exhaust gas flowing into the upstream side exhaust purification catalyst 20 is purified by the upstream side exhaust purification catalyst 20, and along with this the upstream side exhaust purification catalyst 20 is gradually decreased in the stored amount of oxygen OSAsc. Therefore, the cumulative oxygen excess/deficiency ΣOED is also gradually decreased. The unburned gas is not contained in the exhaust gas flowing out from the upstream side exhaust purification catalyst 20 by the purification at the upstream side exhaust purification catalyst 20, and therefore the output air-fuel ratio AFdwn of the downstream side air-fuel ratio sensor 41 becomes substantially stoichiometric air-fuel ratio. Further, since the air-fuel ratio of the exhaust gas flowing into the upstream side exhaust purification catalyst 20 becomes the rich air-fuel ratio, the amount of $NO_x$ exhausted from the upstream side exhaust purification catalyst 20 becomes substantially zero.

If the upstream side exhaust purification catalyst 20 gradually decreases in stored amount of oxygen OSAsc, the stored amount of oxygen OSAsc approaches zero at the time $t_1$. Along with this, part of the unburned gas flowing into the upstream side exhaust purification catalyst 20 starts to flow out without being purified by the upstream side exhaust purification catalyst 20. Due to this, after the time $t_1$ on, the output air-fuel ratio AFdwn of the downstream side air-fuel ratio sensor 41 gradually falls. As a result, at the time $t_2$, the output air-fuel ratio AFdwn of the downstream side air-fuel ratio sensor 41 reaches the rich judgment air-fuel ratio AFrich.

In the present embodiment, when the output air-fuel ratio AFdwn of the downstream side air-fuel ratio sensor 41 becomes the rich judgment air-fuel ratio AFrich or less, to increase the stored amount of oxygen OSAsc, the air-fuel ratio correction amount AFC is switched to the lean set correction amount AFClean (corresponding to the lean set air-fuel ratio). Therefore, the target air-fuel ratio is switched from a rich air-fuel ratio to a lean air-fuel ratio. Further, at this time, the cumulative oxygen excess/deficiency ΣOED is reset to 0.

Note that, in the present embodiment, the air-fuel ratio correction amount AFC is switched after the output air-fuel ratio of the downstream side air-fuel ratio sensor 41 reaches the rich judgment air-fuel ratio. This is because even if the stored amount of oxygen of the upstream side exhaust purification catalyst 20 is sufficient, the air-fuel ratio of the exhaust gas flowing out from the upstream side exhaust purification catalyst 20 is sometimes slightly offset from the stoichiometric air-fuel ratio. Conversely speaking, the rich judgment air-fuel ratio is set to an air-fuel ratio which the air-fuel ratio of the exhaust gas flowing out from the upstream side exhaust purification catalyst 20 will never reach when the stored amount of oxygen of the upstream side exhaust purification catalyst 20 is sufficient.

When the target air-fuel ratio is switched to a lean air-fuel ratio at the time $t_2$, the air-fuel ratio of the exhaust gas flowing into the upstream side exhaust purification catalyst 20 changes from the rich air-fuel ratio to the lean air-fuel ratio. Further, along with this, the output air-fuel ratio AFup of the upstream side air-fuel ratio sensor 40 becomes a lean air-fuel ratio (in actuality, a delay occurs from when the target air-fuel ratio is switched to when the air-fuel ratio of the exhaust gas flowing into the upstream side exhaust purification catalyst 20 changes, but in the illustrated example, it is deemed for convenience that the change is simultaneous). If at the time $t_2$ the air-fuel ratio of the exhaust gas flowing into the upstream side exhaust purification catalyst 20 changes to the lean air-fuel ratio, the upstream side exhaust purification catalyst 20 increases in the stored amount of oxygen OSAsc. Further, along with this, the cumulative oxygen excess/deficiency ΣOED also gradually increases.

Due to this, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 converges to the stoichiometric air-fuel ratio. At this time, the air-fuel ratio of the exhaust gas flowing into the upstream side exhaust purification catalyst 20 becomes the lean air-fuel ratio, but there is sufficient leeway in the oxygen storage ability of the upstream side exhaust purification catalyst 20, and therefore the oxygen in the inflowing exhaust gas is stored in the upstream side exhaust purification catalyst 20 and the $NO_x$ is reduced and purified. Therefore, the exhaust amount of NOx from the upstream side exhaust purification catalyst 20 becomes substantially zero.

After this, if the upstream side exhaust purification catalyst 20 increases in stored amount of oxygen OSAsc, at the time $t_3$, the stored amount of oxygen OSAsc of the upstream side exhaust purification catalyst 20 reaches the switching reference storage amount Cref. For this reason, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, in order to suspend the storage of oxygen to the upstream side exhaust purification catalyst 20, the air-fuel ratio correction amount AFC is switched to the rich set air-fuel amount AFTrich. Therefore, the target air-fuel ratio is switched to a rich air-fuel ratio. Further, at this time, the cumulative oxygen excess/deficiency ΣOED is reset to 0.

In the example which is shown in FIG. 5, the stored amount of oxygen OSAsc falls simultaneously with the target air-fuel ratio being switched at the time $t_3$, but in actuality, a delay occurs from when the target air-fuel ratio is switched to when the stored amount of oxygen OSAsc falls. Further, the air-fuel ratio of the exhaust gas flowing into the upstream side exhaust purification catalyst 20 is sometimes unintentionally significantly shifted, for example, in the case where engine load becomes high by accelerating a vehicle provided with the internal combustion engine and thus the air intake amount is instantaneously significantly shifted.

As opposed to this, the switching reference storage amount Cref is set sufficiently lower than the maximum storable oxygen amount Cmax when the upstream exhaust purification catalyst 20 is new. For this reason, even if such a delay occurs, or even if the air-fuel ratio is unintentionally and instantaneously shifted from the target air-fuel ratio, the stored amount of oxygen OSAsc does not reach the maximum storable oxygen amount Cmax. Conversely, the switching reference storage amount Cref is set to an amount sufficiently small so that the stored amount of oxygen OSAsc does not reach the maximum storable oxygen amount Cmax even if a delay or unintentional shift in air-fuel ratio occurs. For example, the switching reference storage amount Cref is ¾ or less of the maximum storable oxygen amount Cmax when the upstream side exhaust purification catalyst 20 is new, preferably ½ or less, more preferably ⅕ or less.

If the target air-fuel ratio is switched to a rich air-fuel ratio at the time $t_3$, the air-fuel ratio of the exhaust gas flowing into the upstream side exhaust purification catalyst 20 changes from the lean air-fuel ratio to the rich air-fuel ratio. Along with this, the output air-fuel ratio AFup of the upstream side air-fuel ratio sensor 40 becomes a rich air-fuel ratio (in actuality, a delay occurs from when the target air-fuel ratio is switched to when the exhaust gas flowing into the upstream side exhaust purification catalyst 20 changes in air-fuel ratio, but in the illustrated example, it is deemed for convenience that the change is simultaneous). The exhaust gas flowing into the upstream side exhaust purification catalyst 20 contains unburned gas, and therefore the upstream side exhaust purification catalyst 20 gradually decreases in stored amount of oxygen OSAsc. At the time $t_4$, in the same way as the time $t_1$, the output air-fuel ratio AFdwn of the downstream side air-fuel ratio sensor 41 starts to fall. At this time as well, the air-fuel ratio of the exhaust gas flowing into the upstream side exhaust purification catalyst 20 is the rich air-fuel ratio, and therefore $NO_x$ exhausted from the upstream side exhaust purification catalyst 20 is substantially zero.

Next, at the time $t_5$, in the same way as time $t_2$, the output air-fuel ratio AFdwn of the downstream side air-fuel ratio sensor 41 reaches the rich judgment air-fuel ratio AFrich. Due to this, the air-fuel ratio correction amount AFC is switched to the amount corresponding to lean set air-fuel ratio. After this, the cycle of the above mentioned times $t_1$ to $t_5$ is repeated.

As will be understood from the above explanation, according to the present embodiment, it is possible to constantly suppress the amount of $NO_x$ exhausted from the upstream side exhaust purification catalyst 20. That is, as long as performing the control explained above, the exhaust amount of NOx from the upstream side exhaust purification catalyst 20 can basically be zero. Further, since the cumulative period for calculating the cumulative oxygen excess/deficiency ΣOED is short, comparing with the case where the cumulative period is long, a possibility of error occurring is low. Therefore, it is suppressed that NOx is exhausted from the upstream side exhaust purification catalyst 20 due to the calculation error in the cumulative oxygen excess/deficiency ΣOED.

Further, in general, if the stored amount of oxygen of the exhaust purification catalyst is maintained constant, the exhaust purification catalyst falls in oxygen storage ability. That is, it is necessary that the oxygen storage amount of the exhaust purification catalyst is varied in order to maintain the oxygen storage ability of the exhaust purification catalyst high. On the other hand, according to the present embodiment, as shown in FIG. 5, the stored amount of oxygen OSAsc of the upstream side exhaust purification catalyst 20 constantly fluctuates up and down, and therefore the oxygen storage ability is kept from falling.

Note that, in the above embodiment, the air-fuel ratio correction amount AFC is maintained to the lean set correction amount AFClean in the time $t_2$ to $t_3$. However, in this period, the air-fuel ratio correction amount AFC is not necessarily maintained constant, and can be set so as to vary, for example to be gradually reduced. Alternatively, in the period from the time $t_2$ to time $t_3$, the air-fuel ratio correction amount AFC may be temporally set to a value lower than 0 (for example, the rich set correction amount, etc.). In other words, in the period from time $t_2$ to time $t_3$, the target air-fuel ratio may be temporally set to a rich air-fuel ratio.

Similarly, in the above embodiment, the air-fuel ratio correction amount AFC is maintained to the rich set correction amount AFCrich in the time $t_3$ to $t_5$. However, in this period, the air-fuel ratio correction amount AFC is not necessarily maintained constant, and can be set so as to vary, for example to be gradually increased. Alternatively, in the period from the time $t_3$ to time $t_5$, the air-fuel ratio correction amount AFC may be temporally set to a value higher than 0 (for example, the lean set correction amount, etc.). In other words, in the period from the time $t_3$ to $t_5$, the target air-fuel ratio may be temporally set to a lean air-fuel ratio.

However, even in this case, the air-fuel ratio correction amount AFC in the time $t_2$ to $t_3$ is preferably set so that the difference between the average value of the target air-fuel ratio at this period and the stoichiometric air-fuel ratio is larger than the difference between the average value of the target air-fuel ratio in the time $t_3$ to $t_5$ and the stoichiometric air-fuel ratio. However, the air-fuel ratio correction amount AFC in the time $t_2$ to $t_3$ may be set so that the difference between the average value of the target air-fuel ratio at this period and the stoichiometric air-fuel ratio is lower than the difference between the average value of the target air-fuel ratio in the time $t_3$ to $t_5$ and the stoichiometric air-fuel ratio.

Note that, in the present embodiment, setting of the air-fuel ratio correction amount AFC, i.e., setting of the target air-fuel ratio, is performed by the ECU 31. Therefore, it can be said that when the air-fuel ratio of the exhaust gas detected by the downstream side air-fuel ratio sensor 41 becomes the rich judgment air-fuel ratio or less, the ECU 31 makes the target air-fuel ratio of the exhaust gas flowing into the upstream side exhaust purification catalyst 20 the lean air-fuel ratio continuously or intermittently until the stored amount of oxygen OSAsc of the upstream side exhaust purification catalyst 20 becomes the switching reference storage amount Cref, and when the stored amount of oxygen OSAsc of the upstream side exhaust purification catalyst 20 becomes the switching reference storage amount Cref or more the ECU 31 makes the target air-fuel ratio the rich air-fuel ratio continuously or intermittently until the air-fuel ratio of the exhaust gas detected by the downstream side air-fuel ratio sensor 41 becomes the rich judgment air-fuel ratio or less without the stored amount of oxygen OSAsc reaching the maximum storable oxygen amount Cmaxn.

More simply speaking, in the present embodiment, it can be said that the ECU 31 switches the target air-fuel ratio to the lean air-fuel ratio when the air-fuel ratio detected by the downstream side air-fuel ratio sensor 41 becomes the rich judgment air-fuel ratio or less and switches the target air-fuel ratio to the rich air-fuel ratio when the stored amount of oxygen OSAsc of the upstream side exhaust purification catalyst 20 becomes the switching reference storage amount Cref or more.

Further, in the above embodiment, the cumulative oxygen excess/deficiency ΣOED is calculated, based on the output air-fuel ratio AFup of the upstream air-fuel ratio sensor 40 and the estimated value of the air intake amount to the combustion chamber 6, etc. However, the stored amount of oxygen OSAsc may also be calculated based on parameters other than these parameters and may be estimated based on parameters which are different from these parameters. Further, in the above embodiment, if the cumulative oxygen excess/deficiency ΣOED becomes the switching reference value OEDref or more, the target air-fuel ratio is switched from the lean set air-fuel ratio to the rich set air-fuel ratio. However, the timing of switching the target air-fuel ratio from the lean set air-fuel ratio to the rich set air-fuel ratio may, for example, also be based on the engine operating time from when switching the target air-fuel ratio from the rich set air-fuel ratio to the lean set air-fuel ratio or other parameter. However, even in this case, the target air-fuel ratio has to be switched from the lean set air-fuel ratio to the rich set air-fuel ratio while the stored amount of oxygen OSA of the upstream side exhaust purification catalyst 20 is estimated to be smaller than the maximum storable oxygen amount.

<Explanation of Normal Control Using Also Downstream Side Exhaust Purification Catalyst>

Further, in the present embodiment, as explained above, in addition to the upstream side exhaust purification catalyst 20, a downstream side exhaust purification catalyst 24 is also provided. The oxygen storage amount OSAufc of the downstream side exhaust purification catalyst 24 become a value near the maximum storable oxygen amount Cmax by fuel cut control performed every certain extent of time period. For this reason, even if exhaust gas containing unburned gas flows out from the upstream side exhaust purification catalyst 20, the unburned gas is oxidized and purified at the downstream side exhaust purification catalyst 24.

Note that, "fuel cut control" means control which prevents fuel from being injected from the fuel injector 11 even in a state where the crankshaft or piston 3 operates (that is, during operation of the internal combustion engine), at the time of deceleration of the vehicle mounting the internal combustion engine. If performing such control, a large amount of air flows into the two exhaust purification catalysts 20, 24.

Figure 7:
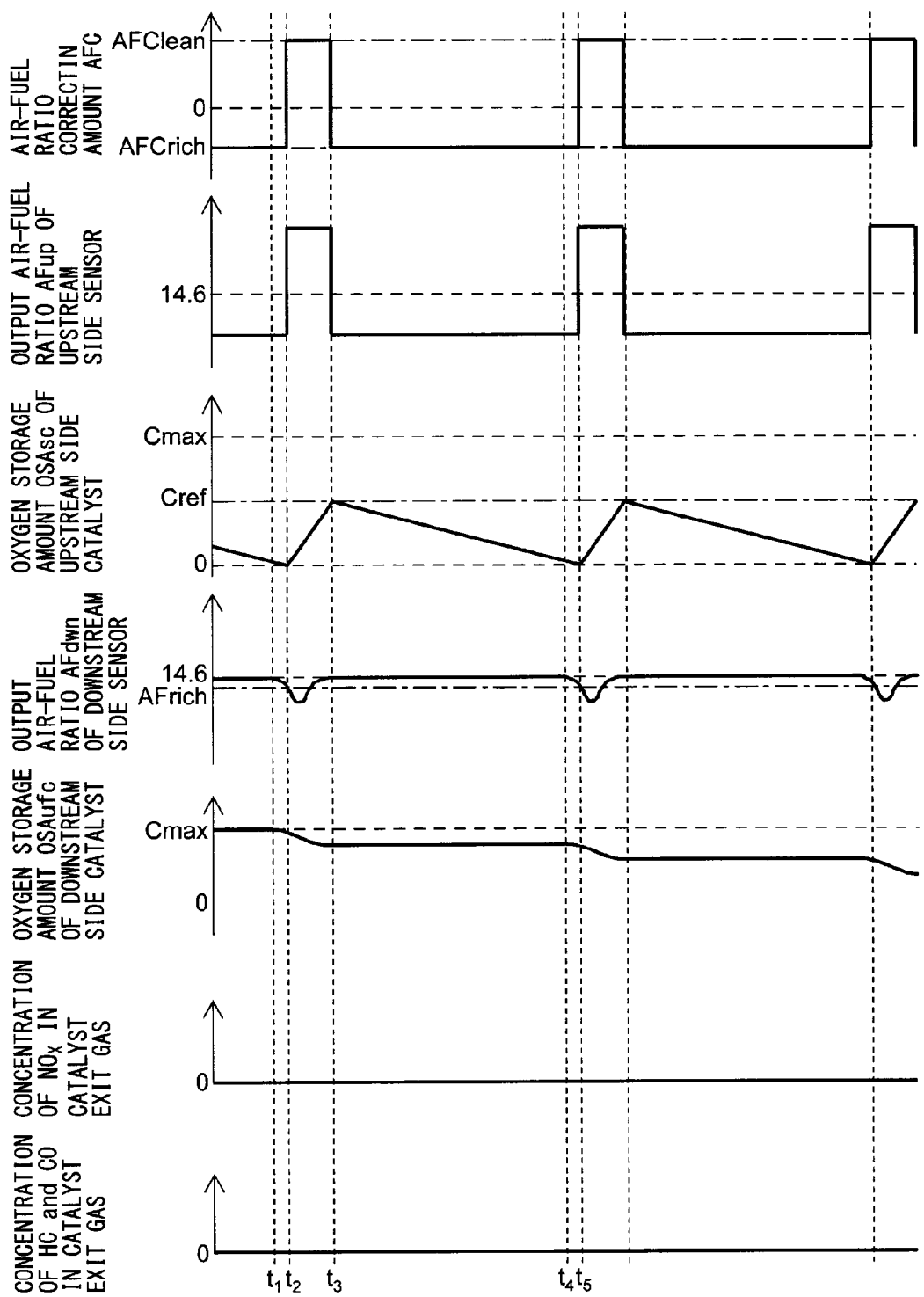
FIG. 7 is a time chart of an air-fuel ratio correction amount etc. when performing an air-fuel ratio control.

In the example which is shown in FIG. 7, fuel cut control is performed before the time $t_1$. For this reason, before the time $t_1$, the oxygen storage amount OSAufc of the downstream side exhaust purification catalyst 24 is a value near the maximum storable oxygen amount Cmax. Further, before the time $t_1$, the air-fuel ratio of the exhaust gas flowing out from the upstream side exhaust purification catalyst 20 is maintained at substantially the stoichiometric air-fuel ratio. For this reason, the oxygen storage amount OSAufc of the downstream side exhaust purification catalyst 24 is maintained constant.

After that, in the times $t_1$ to $t_3$, the air-fuel ratio of the exhaust gas flowing out from the upstream side exhaust purification catalyst 20 becomes the rich air-fuel ratio. For this reason, exhaust gas containing unburned gas flows into the downstream side exhaust purification catalyst 24.

As explained above, the downstream side exhaust purification catalyst 24 stores a large amount of oxygen, and therefore if the exhaust gas flowing into the upstream side exhaust purification catalyst 20 contains unburned gas, the stored oxygen enables the unburned gas to be oxidized and purified. Further, along with this, the oxygen storage amount OSAufc of the downstream side exhaust purification catalyst 24 is decreased. However, in the times $t_1$ to $t_3$, the unburned gas flowing out from the upstream side exhaust purification catalyst 20 does not become that great, and therefore the amount of decrease of the oxygen storage amount OSAufc during that interval is slight. For this reason, all of the unburned gas flowing out from the upstream side exhaust purification catalyst 20 in the times $t_1$ to $t_3$ is reduced and purified at the downstream side exhaust purification catalyst 24.

After the time $t_4$ as well, at every certain extent of time interval, in the same way as the case as the times $t_1$ to $t_3$, unburned gas flows out from the upstream side exhaust purification catalyst 20. The thus outflowing unburned gas is basically reduced and purified by the oxygen which is stored in the downstream side exhaust purification catalyst 24. As a result, as shown in FIG. 7, the concentration of $NO_x$ in the exhaust gas which is exhausted from the upstream side exhaust purification catalyst 20 is substantially zero at all times and the concentration of unburned gas in the exhaust gas which is exhausted from the downstream side exhaust purification catalyst 24 is substantially zero at all times. As a result, the $NO_x$ concentration and unburned gas concentration in the exhaust gas flowing out from the internal combustion engine is basically substantially zero at all times.

<Relationship Between Fuel Cut Control and Oxygen Storage Amount>

In the meantime, the above-mentioned fuel cut control is performed at the time of deceleration etc. of the vehicle mounting the internal combustion engine. Specifically, it is performed when predetermined conditions for execution are satisfied. As these conditions for execution, for example, the following two may be enumerated. One is that the amount of depression of the accelerator pedal 42 be zero, that is, the engine load L which is detected by the load sensor 43 be zero. The other is that the engine speed which is calculated based on the output of the crank angle sensor 44 be a predetermined lowest reference speed (for example, 2000 rpm) or more.

In this way, fuel cut control is performed at the time of deceleration etc. of the vehicle mounting the internal combustion engine, and therefore is not necessarily performed at a constant time interval etc. For this reason, in some cases, fuel cut control is not performed over a long period of time. In such a case, if unburned gas repeatedly flows out from the upstream side exhaust purification catalyst 20, finally the oxygen storage amount OSAufc of the downstream side exhaust purification catalyst 24 reaches zero. If the oxygen storage amount OSAufc of the downstream side exhaust purification catalyst 24 reaches zero, the downstream side exhaust purification catalyst 24 can no longer purify the unburned gas any further and unburned gas flows out from the downstream side exhaust purification catalyst 24.

Further, according to the inventors of the present application, it was learned that in such a state where the oxygen storage amount OSAufc of the downstream side exhaust purification catalyst 24 is substantially zero, even if exhaust gas of a lean air-fuel ratio of a low leanness (for example, air-fuel ratio of 15 or so) flows into the downstream side exhaust purification catalyst 24, the downstream side exhaust purification catalyst 24 does not store much oxygen at all. The cause of such a phenomenon is believed to be that so long as oxygen or unburned gas does not flow out from the upstream side exhaust purification catalyst 20, almost no oxygen absorption and release action is performed at the downstream side exhaust purification catalyst 24.

That is, in the upstream side exhaust purification catalyst 20, even if, for example, the air-fuel ratio of the inflowing exhaust gas is the rich air-fuel ratio, this does not mean that all of the oxygen reacts in the combustion chambers 5, and thus oxygen remains. As a result, in the upstream side exhaust purification catalyst 20, in fact, regardless of the air-fuel ratio of the inflowing exhaust gas, an oxygen absorption and release action is performed. As opposed to this, in the downstream side exhaust purification catalyst 24, the remaining oxygen or unburned gas is removed by the upstream side exhaust purification catalyst 20. Therefore, if the air-fuel ratio of the inflowing exhaust gas is near the stoichiometric air-fuel ratio, the exhaust gas contains almost no oxygen or unburned gas. For this reason, in the downstream side exhaust purification catalyst 24, oxygen is not absorbed and released frequently. If the frequency of absorption and release of oxygen falls in this way, in the downstream side exhaust purification catalyst 24, oxygen becomes harder to be stored. As a result, in the state where the oxygen storage amount OSAufc of the downstream side exhaust purification catalyst 24 becomes substantially zero, even if exhaust gas of a lean air-fuel ratio of a low leanness flows into the downstream side exhaust purification catalyst 24, it is believed that the downstream side exhaust purification catalyst 24 will not store much oxygen at all.

On the other hand, according to the inventors of the present application, it was learned that even in the state where the oxygen storage amount OSAufc of the downstream side exhaust purification catalyst 24 becomes substantially zero, if exhaust gas of a lean air-fuel ratio of a high leanness (for example, air-fuel ratio 16 or more) flows into the downstream side exhaust purification catalyst 24, the downstream side exhaust purification catalyst 24 stores oxygen. Therefore, if performing fuel cut control etc. to thereby make gas of a lean air-fuel ratio with a high leanness flow into the downstream side exhaust purification catalyst 24, the oxygen storage amount of the downstream side exhaust purification catalyst 24 can be restored.

<Change of Conditions for Execution of Fuel Cut Control>

Therefore, in this embodiment of the present invention, the conditions for execution of fuel cut control is eased based on the oxygen storage amount OSAufc of the downstream side exhaust purification catalyst 24. Specifically, first, the oxygen storage amount OSAufc of the downstream side exhaust purification catalyst 24 is calculated.

The oxygen storage amount OSAufc of the downstream side exhaust purification catalyst 24, like the oxygen storage amount OSAsc of the upstream side exhaust purification catalyst 20, is calculated based on the cumulative value of the oxygen excess/deficiency of the exhaust gas flowing into the downstream side exhaust purification catalyst 24. The oxygen excess/deficiency of the exhaust gas flowing into the downstream side exhaust purification catalyst 24 is calculated based on the output air-fuel ratio of the downstream side air-fuel ratio sensor 41 and the estimated value of the intake air amount or the fuel feed amount etc. Specifically, the oxygen excess/deficiency OEDufc of the exhaust gas flowing into the downstream side exhaust purification catalyst 24 is, for example, calculated by the following formula (2). However, during fuel cut control, the oxygen excess/deficiency OEDufc of the exhaust gas flowing into the downstream side exhaust purification catalyst 24 is, for example, calculated by the following formula (3). Note that, in the following formulas (2) and (3), AFdwn indicates the output air-fuel ratio of the downstream side air-fuel ratio sensor and Gn indicates the intake air amount.

$$ODE_{ufc}=0.23*Q_i*(AFdwn-AFR) \quad (2)$$

$$ODE_{ufc}=0.23*Gn \quad (3)$$

Therefore, the cumulative oxygen excess/deficiency $\Sigma ODE$ in the exhaust gas flowing into the downstream side exhaust purification catalyst 24 is basically calculated by the following formula (4) and, further, is calculated by the following formula (5) during fuel cut control. Note that, the "i"s in formulas (4) and (5) indicate the number of calculations, while i−1 indicates a previous calculation.

$$\Sigma ODE_{ufc}(i)=\Sigma ODE_{ufc}(i-1)+0.23*Q_i*(AFdwn-AFR) \quad (4)$$

$$\Sigma ODE_{ufc}(i)=\Sigma ODE_{ufc}(i-1)+0.23*Gn \quad (5)$$

In the present embodiment, the conditions for execution of fuel cut control are changed in accordance with the thus calculated oxygen storage amount OSAufc of the downstream side exhaust purification catalyst 24. Specifically, in the present embodiment, the lowest reference speed in the fuel cut execution conditions is decreased from the speed up to then when the oxygen storage amount OSAufc of the downstream side exhaust purification catalyst 24 becomes the predetermined limit storage amount or less compared with when the oxygen storage amount OSAufc is larger than the limit storage amount.

Note that, the limit storage amount at that time is set to an amount greater by a certain extent than the storage amount where the concentration of unburned gas in the exhaust gas flowing out from the exhaust purification catalyst starts to rapidly rise (in FIG. 2(B), Clowlim) when the air-fuel ratio of the exhaust gas flowing into the exhaust purification catalyst is the rich air-fuel ratio. Specifically, it is 1/10 or more of the maximum storable oxygen amount Cmax when the downstream side exhaust purification catalyst 24 is unused, preferably 1/5 or more, more preferably 1/2 or more.

<Explanation of Conditions for Execution of Fuel Cut Control Using Time Chart>

Figure 8:
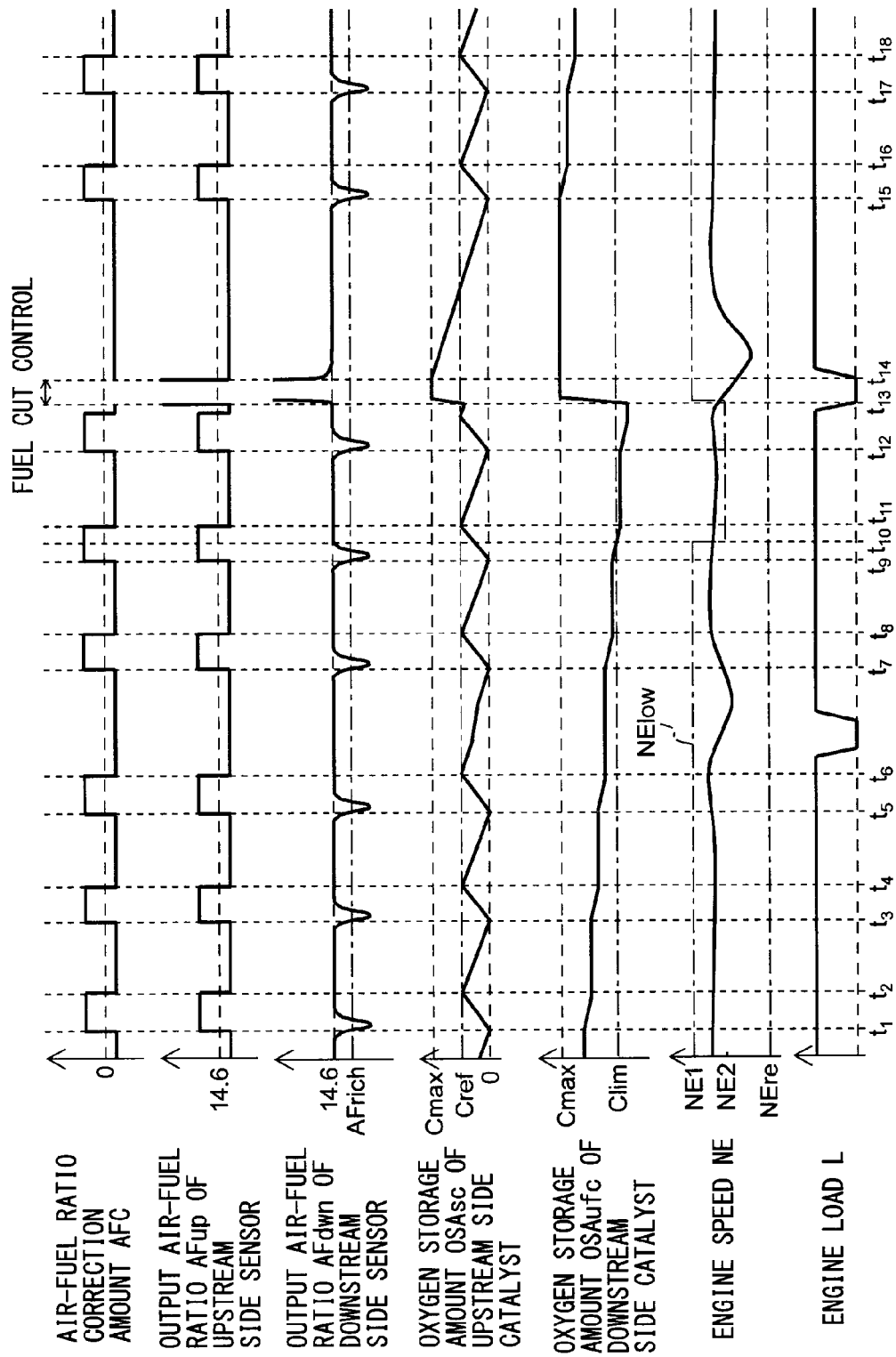
FIG. 8 is a time chart of an air-fuel ratio correction amount etc. in the case where the conditions for execution of fuel cut control is changed based on the oxygen storage amount of the downstream side exhaust purification catalyst.

Below, referring to the time chart of FIG. 8, change of the conditions for execution of fuel cut control will be explained. FIG. 8 is a time chart of the air-fuel ratio correction amount AFC, output air-fuel ratio AFup of the upstream side air-fuel ratio sensor 40, output air-fuel ratio AFdwn of the downstream side air-fuel ratio sensor 41, oxygen storage amount OSAsc of the upstream side exhaust purification catalyst 20, oxygen storage amount OSAufc of the downstream side exhaust purification catalyst 24, engine speed NE, and engine load L, in the case of changing the conditions of execution of fuel cut control based on the oxygen storage amount OSAufc of the downstream side exhaust purification catalyst 24. Note that, in the figure, NElow indicates one of the conditions for execution of fuel cut control, that is, the lowest reference speed. When the engine speed NE is lower than this speed, even if the other execution conditions are satisfied, fuel cut control is not performed. Further, in the figure, NEre is the return speed of the fuel cut control. Therefore, when the engine speed falls to the return speed NEre during fuel cut control, even when fuel cut control execution conditions other than the engine speed stand, fuel cut control is suspended and fuel injection from the fuel injector 11 is resumed.

In the example shown in FIG. 8, control similar to the above-mentioned air-fuel ratio control is performed from before the time $t_1$. For this reason, at the times $t_1$, $t_3$, $t_5$, $t_7$, etc., if the output air-fuel ratio AFdwn of the downstream side air-fuel ratio sensor 41 becomes the rich judgment air-fuel ratio AFrich or less, the air-fuel ratio correction amount AFC is switched to the lean set correction amount AFClean, to increase the oxygen storage amount OSAsc. Due to this, the target air-fuel ratio is switched from the rich air-fuel ratio to the lean air-fuel ratio.

On the other hand, at the times $t_2$, $t_4$, $t_6$, $t_8$, etc., if the oxygen storage amount OSAsc of the upstream side exhaust purification catalyst 20 reaches the switching reference storage amount Cref, that is, the cumulative oxygen excess/deficiency $\Sigma$OED reaches the switching reference value OEDref, the air-fuel ratio correction amount AFC is switched to the rich set correction amount AFCrich. Due to this, the target air-fuel ratio is switched from the lean air-fuel ratio to the rich air-fuel ratio.

Further, at the times $t_1$, $t_3$, $t_5$, $t_7$, etc., the air-fuel ratio of the exhaust gas flowing out from the upstream side exhaust purification catalyst 20 becomes temporarily a rich air-fuel ratio. For this reason, exhaust gas containing unburned gas flows into the downstream side exhaust purification catalyst 24. This unburned gas reacts with the oxygen stored in the downstream side exhaust purification catalyst 24. As a result, at the times $t_1$, $t_3$, $t_5$, $t_7$, etc., the oxygen storage amount of the downstream side exhaust purification catalyst 24 is decreased slightly.

Here, in the times $t_1$ to $t_{10}$, the lowest reference speed NElow is set to the relatively high normal speed NE1 (for example, 2000 rpm). Further, as will be understood from FIG. 8, in the times $t_1$ to $t_{10}$, the engine speed transits at a speed lower than the lowest reference speed NElow (that is, NE1). As explained above, one of the conditions for execution of fuel cut control is that the engine speed NE be the lowest reference speed NElow or more, and therefore in the times $t_1$ to $t_{10}$, the conditions for execution of fuel cut control do not stand. For this reason, in the times $t_1$ to $t_{10}$, fuel cut control is not performed and, as a result, the oxygen storage amount OSAufc of the downstream side exhaust purification catalyst 24 does not increase, but continues to decrease.

If, in this way, the oxygen storage amount OSAufc of the downstream side exhaust purification catalyst 24 continues to be reduced, finally, at the time $t_{10}$, the oxygen storage amount OSAufc of the downstream side exhaust purification catalyst 24 reaches the limit storage amount Clim. If, in this way, the oxygen storage amount OSAufc of the downstream side exhaust purification catalyst 24 reaches the limit storage amount Clim, in the present embodiment, the lowest reference speed NElow is made to decrease to a speed NE2 lower than the normal speed NE1 (for example, 1500 rpm). More accurately, if the cumulative oxygen excess/deficiency of the downstream side exhaust purification catalyst 24 from performing the previous time fuel cut control becomes an amount corresponding to the value obtained by subtracting the limit storage amount Clim from the maximum storable oxygen amount Cmax, the lowest reference speed NElow is reduced to the speed NE2.

In the example shown in FIG. 8, if, at the time $t_{10}$, the lowest reference speed NElow is lowered to NE2, the actual engine speed NE at that time becomes the lowest reference speed NElow or more. For this reason, at the time $t_{10}$, the conditions for execution of fuel cut control relating to the engine speed NE stand. However, in the example shown in FIG. 8, at the time $t_{10}$, the engine load L does not become zero. For this reason, the conditions for execution of fuel cut control do not stand at this time either. Accordingly, at the time $t_{10}$, fuel cut control is not started. After that, so long as the oxygen storage amount OSAufc of the downstream side exhaust purification catalyst 24 is the limit storage amount Clim or less, the lowest reference speed NElow is maintained at the low speed NE2.

In the illustrated example, after that, in the times $t_{10}$ to $t_{13}$, the actual engine speed NE is maintained at the lowest reference speed NElow or more. In addition, in the illustrated example, at the time $t_{13}$, the amount of depression of the accelerator pedal 42 of the driver becomes zero and accordingly the engine load L becomes zero. Due to this, conditions for execution of fuel cut control stand, and therefore fuel cut control is started at the time $t_{13}$.

If fuel cut control is started, air flows into the engine exhaust passage, and therefore the oxygen storage amount OSA of the two exhaust purification catalysts 20, 24 rapidly increases. For this reason, the oxygen storage amount OSAufc of the downstream side exhaust purification catalyst 24 rapidly increases and becomes the limit storage amount Clim or more. If, in this way, the oxygen storage amount OSAufc of the downstream side exhaust purification catalyst 24 becomes the limit storage amount Clim or more, the lowest reference speed NElow is returned from the low speed NE2 to the normal speed NE1.

After that, in the example shown in FIG. 8, at the time $t_{14}$, the engine load L increases, whereupon fuel cut control is ended. Due to this, control similar to the air-fuel ratio control which was explained with reference to FIG. 5 and FIG. 7 is resumed. Therefore, until the output air-fuel ratio AFdwn of the downstream side air-fuel ratio sensor 41 becomes the rich judgment air-fuel ratio AFrich or less at the time $t_{15}$, the air-fuel ratio correction amount AFC is set to the rich set correction amount AFCrich. Due to this, the target air-fuel ratio is set to the rich air-fuel ratio. Further, if, at the time $t_{15}$, the output air-fuel ratio AFdwn of the downstream side air-fuel ratio sensor 41 becomes the rich judgment air-fuel ratio AFrich or less, after that, as explained above, the air-fuel ratio correction amount AFC is alternately set to the rich set correction amount AFCrich and the lean set correction amount AFClean.

As explained above, in the example shown in FIG. 8, at the time $t_{13}$ at which fuel cut control is started, the actual engine speed NE becomes the lowest reference speed NElow at the time of normal operation, that is, NE1 or lower. Therefore, even if the lowest reference speed NElow has been maintained at the normal speed NE1, fuel cut control is not performed at the time $t_{13}$ either. Accordingly, according to the present embodiment, the lowest reference speed NElow is lowered to NE2 after the time $t_{10}$ to thereby ease the conditions for execution of fuel cut control and, due to this, the frequency of performance of fuel cut control can be said to become higher.

In particular, in the present embodiment, when the oxygen storage amount OSAufc of the downstream side exhaust purification catalyst 24 becomes smaller, the conditions for execution of fuel cut control are eased. For this reason, when the oxygen storage amount OSAufc of the downstream side exhaust purification catalyst 24 becomes smaller, fuel cut control becomes easier to be performed and accordingly exhaust gas of a lean air-fuel ratio with a high leanness easily flows into the downstream side exhaust purification catalyst 24. As a result, the oxygen storage amount OSAufc of the downstream side exhaust purification catalyst 24 can be reliably increased. Due to this, the oxygen storage amount OSAufc of the downstream side exhaust purification catalyst 24 can be kept from reaching substantially zero and in turn unburned gas can be kept from flowing out from the downstream side exhaust purification catalyst 24.

Note that, in the above embodiment, when the oxygen storage amount OSAufc of the downstream side exhaust purification catalyst 24 reaches the limit storage amount Clim at the time $t_{10}$, the lowest reference speed NElow is reduced in a stepwise manner from the normal speed NE1 to a lower speed NE2. However, it may also be changed in other ways. For example, the lowest reference speed NElow may be reduced a bit at a time in a stepwise manner over several times based on the oxygen storage amount OSAufc of the downstream side exhaust purification catalyst 24. Alternatively, the lowest reference speed NElow may be set so as to be gradually lowered when the oxygen storage amount OSAufc of the downstream side exhaust purification catalyst 24 decreases from the predetermined storage amount. However, in any case, the lowest reference speed NElow can at least be said so as to become lower when the oxygen storage amount OSAufc of the downstream side exhaust purification catalyst 24 is the predetermined limit storage amount or less than when it is larger than the limit storage amount.

Further, in the above embodiment, as the underlying air-fuel ratio control, control is performed that the target air-fuel ratio is switched to the lean air-fuel ratio when the air-fuel ratio detected by the downstream side air-fuel ratio sensor 41 becomes the rich judgment air-fuel ratio or less, and the target air-fuel ratio is switched to the rich air-fuel ratio when the oxygen storage amount OSAsc of the upstream side exhaust purification catalyst 20 becomes the switching reference storage amount Cref or more. However, the underlying air-fuel ratio control is not necessarily limited to this control. For example, control may also be performed so that the target air-fuel ratio is switched to the lean air-fuel ratio when the output air-fuel ratio AFdwn of the downstream side air-fuel ratio sensor 41 becomes the rich judgment air-fuel ratio or less, and the target air-fuel ratio is switched to the rich air-fuel ratio when the output air-fuel ratio AFdwn of the downstream side air-fuel ratio sensor 41 becomes the lean judgment air-fuel ratio or more.

<Explanation of Flow Chart>

Figure 9:
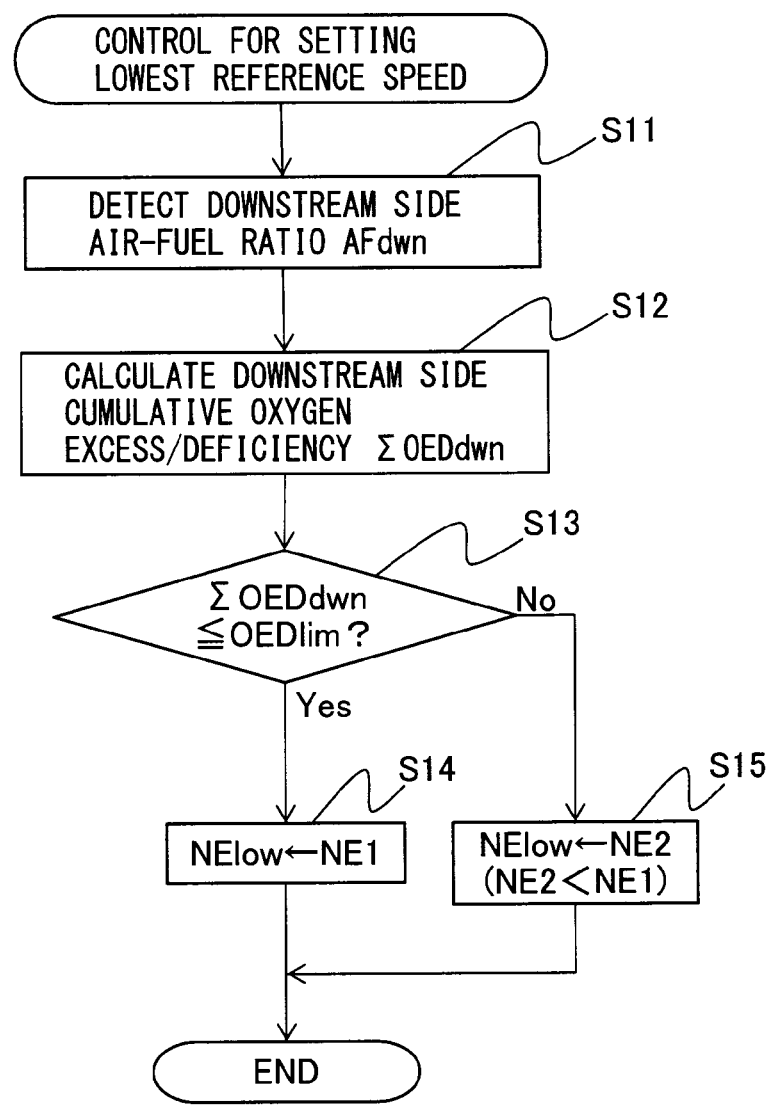
FIG. 9 is a flow chart which shows a control routine of control for setting a lowest reference speed.

FIG. 9 is a flow chart which shows the control routine for control for setting the lowest reference speed NElow in the present embodiment. The illustrated control routine is performed by interruption every certain time interval.

First, as shown at step S11, the downstream side air-fuel ratio sensor 41 detects the output air-fuel ratio AFdwn. Next, at step S12, the cumulative oxygen excess/deficiency ΣOEDdwn after the end of the previous time of fuel cut control for the downstream side exhaust purification catalyst 24 is calculated based on the output air-fuel ratio AFdwn which was detected at step S11 by the downstream side air-fuel ratio sensor 41. The cumulative oxygen excess/deficiency ΣOEDdwn is calculated based on the above-mentioned formula (4) and formula (5). The cumulative oxygen excess/deficiency ΣOEDdwn becomes smaller in value if the oxygen storage amount OSAufc of the downstream side exhaust purification catalyst 24 becomes smaller and therefore can be said to be a value which expresses the oxygen storage amount OSAufc of the downstream side exhaust purification catalyst 24.

Next, at step S13, it is judged if the cumulative oxygen excess/deficiency ΣOEDdwn of the downstream side exhaust purification catalyst 24 is a predetermined limit excess/deficiency OEDlim or less. The limit excess/deficiency OEDlim is a value which corresponds to the limit storage amount Clim and the fact that the cumulative oxygen excess/deficiency ΣOEDdwn is the limit excess/deficiency OEDlim or less means that the oxygen storage amount OSAufc of the downstream side exhaust purification catalyst 24 is the limit storage amount Clim or more. Conversely, the fact that the cumulative oxygen excess/deficiency ΣOEDdwn is larger than the limit excess/deficiency OEDlim means that the oxygen storage amount OSAufc of the downstream side exhaust purification catalyst 24 is smaller than the limit storage amount Clim.

If it is judged at step S13 that the cumulative oxygen excess/deficiency ΣOEDdwn of the downstream side exhaust purification catalyst 24 is the limit excess/deficiency OEDlim or less, that is, it is judged that the oxygen storage amount OSAufc of the downstream side exhaust purification catalyst 24 is the limit storage amount Clim or more, the routine proceeds to step S14. At step S14, the lowest reference speed NElow in the conditions for execution of fuel cut control is set to the normal speed NE1 and the control routine is ended.

On the other hand, if at step S13 it is judged that the cumulative oxygen excess/deficiency ΣOEDdwn of the downstream side exhaust purification catalyst 24 is greater than the limit excess/deficiency OEDlim, that is, it is judged that the oxygen storage amount OSAufc of the downstream side exhaust purification catalyst 24 is smaller than the limit storage amount Clim, the routine proceeds to step S15. At step S15, the lowest reference speed NElow in the conditions for execution of fuel cut control is set to the speed NE2 (NE2<NE1) lower than normal and the control routine is ended.

Second Embodiment

Next, referring to FIG. 10, a second embodiment of the present invention will be explained. The configuration and control of the internal combustion engine according to the second embodiment are basically similar to the configuration and control of the control device of the internal combustion engine according to the first embodiment. However, in the first embodiment, the oxygen storage amount OSAufc of the downstream side exhaust purification catalyst 24 is estimated based on the output air-fuel ratio AFdwn of the downstream side air-fuel ratio sensor 41, while, in the present embodiment, the oxygen storage amount OSAufc of the downstream side exhaust purification catalyst 24 is estimated based on the cumulative value of the amount of intake air which is taken into the combustion chambers 5 of the internal combustion engine (cumulative intake air amount).

In the present embodiment as well, as air-fuel ratio control, control similar to the air-fuel ratio control, which is shown in FIG. 5 and FIG. 7, is performed. When performing such air-fuel ratio control, the oxygen storage amount OSAsc of the upstream side exhaust purification catalyst 20 varies from substantially zero to the switching reference storage amount Cref, then releases the oxygen under the substantially zero state in a repeated cycle. Further, in this single cycle, the total flow rate of the exhaust gas flowing into the upstream side exhaust purification catalyst 20 becomes substantially constant. That is, during the period of one cycle, the cumulative value of the intake air amount which is supplied to the internal combustion engine becomes substantially constant.

On the other hand, during the above-mentioned one cycle, the oxygen storage amount OSAsc of the upstream side exhaust purification catalyst 20 temporarily becomes substantially zero and the unburned gas flows out from the upstream side exhaust purification catalyst 20. At this time, the amount of unburned gas flowing out from the upstream side exhaust purification catalyst 20 depends on the delay from when the output air-fuel ratio AFdwn of the downstream side air-fuel ratio sensor 41 reaches the rich judgment air-fuel ratio AFrich and the target air-fuel ratio is switched to the lean air-fuel ratio to when the lean air-fuel ratio exhaust gas reaches the upstream side exhaust purification catalyst 20. For this reason, during the above-mentioned one cycle, the amount of unburned gas flowing out from the upstream side exhaust purification catalyst 20 becomes substantially constant. Therefore, if considering together the fact that in the period of one cycle, the cumulative value of the intake air amount which is supplied to the internal combustion engine becomes substantially constant, it can be said that the amount of unburned gas flowing into the upstream side exhaust purification catalyst 20 changes along with the cumulative intake air amount to the internal combustion engine.

Therefore, in the present embodiment, the oxygen storage amount OSAufc of the downstream side exhaust purification catalyst 24 is estimated based on the cumulative intake air amount in the internal combustion engine after the end of the previous fuel cut control. Further, when the cumulative intake air amount ΣGa in the internal combustion engine after the end of the previous fuel cut control reaches a predetermined limit cumulative intake air amount Galim (corresponding to limit storage amount Clim), the lowest reference speed NElow is lowered in a stepwise manner from the normal speed NE1 to the lower speed NE2.

Figure 10:
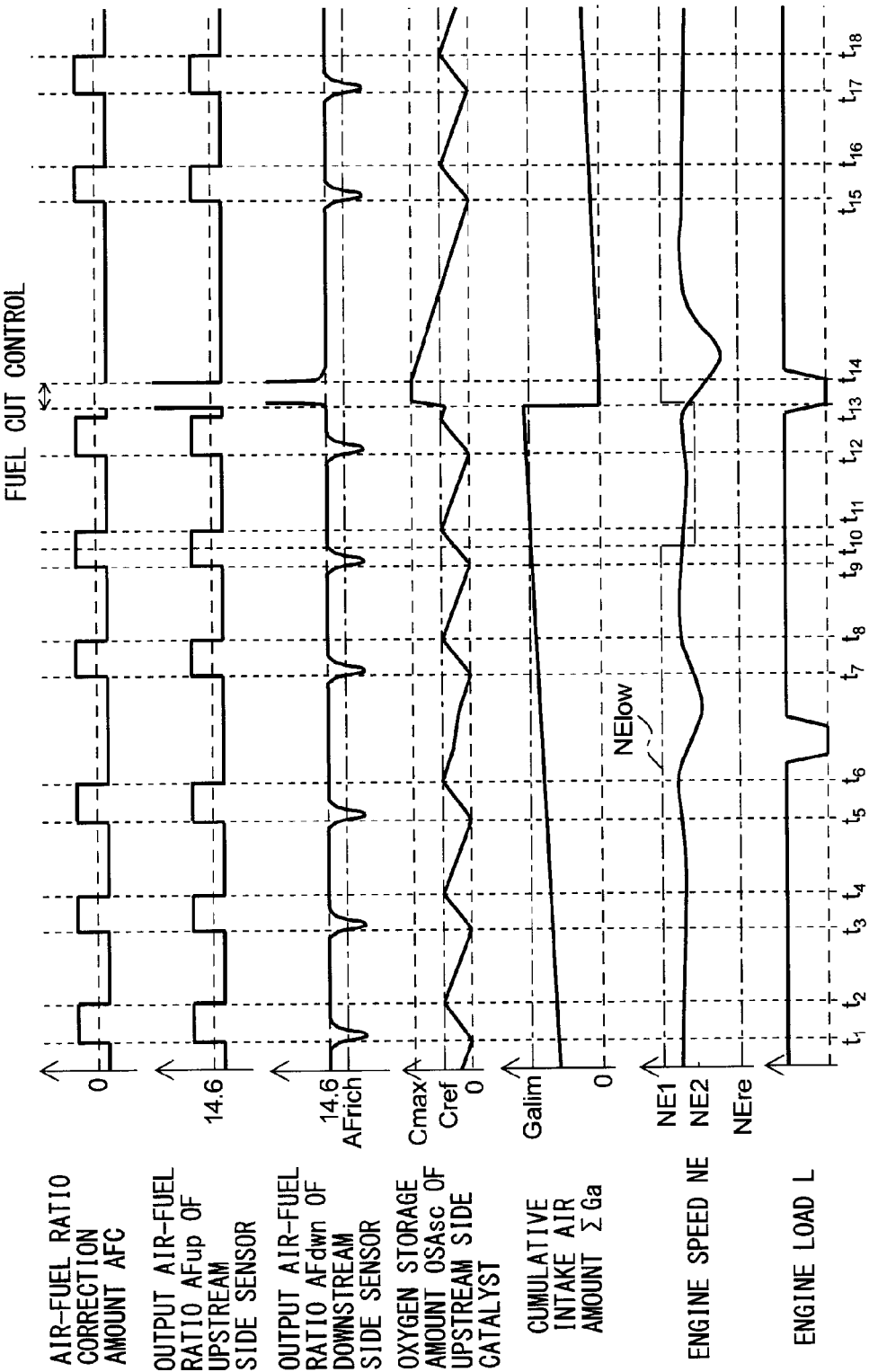
FIG. 10 is a time chart of an air-fuel ratio correction amount etc. in the case where the conditions for execution of fuel cut control is changed based on the cumulative intake air amount to the internal combustion engine.

FIG. 10 is a time chart similar to FIG. 8 in the case of changing the conditions for execution of fuel cut control based on the cumulative intake air amount ΣGa of the internal combustion engine. In the example shown in FIG. 10 as well, in the same way as the example shown in FIG. 8, at the times $t_1$, $t_3$, $t_5$, $t_7$, etc., the target air-fuel ratio is switched from the rich air-fuel ratio to the lean air-fuel ratio, while at the times $t_2$, $t_4$, $t_6$, $t_8$, etc., the target air-fuel ratio is switched from the lean air-fuel ratio to the rich air-fuel ratio.

Further, in FIG. 10 as well, in the time $t_1$ to the time $t_{10}$, the lowest reference speed NElow is set to the relatively high normal speed NE1 (for example, 2000 rpm). In addition, in the time $t_1$ to the time $t_{10}$, fuel cut control is not being performed, and therefore the cumulative intake air amount ΣGa after the end of the previous fuel cut control gradually increases.

In this way, if the cumulative intake air amount ΣGa continues to increase, finally, at the time $t_{10}$, the cumulative intake air amount ΣGa reaches the limit cumulative intake air amount Galim. If, in this way, the cumulative intake air amount ΣGa reaches the limit cumulative intake air amount Galim, in the present embodiment, the lowest reference speed NElow is decreased to a speed NE2 (for example, 1500 rpm) lower than the normal speed NE1.

In the example shown in FIG. 10, at the time $t_{10}$, the lowest reference speed NElow is decreased to NE2, and at that time the actual engine speed NE becomes the lowest reference speed NElow or more. However, at the time $t_{10}$, the engine load L does not become zero and fuel cut control is not started. In the example shown in FIG. 10, after that, at the time $t_{13}$, the engine load L becomes zero and the conditions for execution of fuel cut control stand, and therefore at the time $t_{13}$, fuel cut control is started.

Further, if fuel cut control is started, the cumulative intake air amount ΣGa is reset to zero. After that, in the example which is shown in FIG. 10, at the time $t_{14}$, the engine load L is increased whereby the fuel cut control is ended. Then, the cumulative addition of the intake air amount is started to calculate the cumulative intake air amount ΣGa.

<Explanation of Flow Chart>

Figure 11:
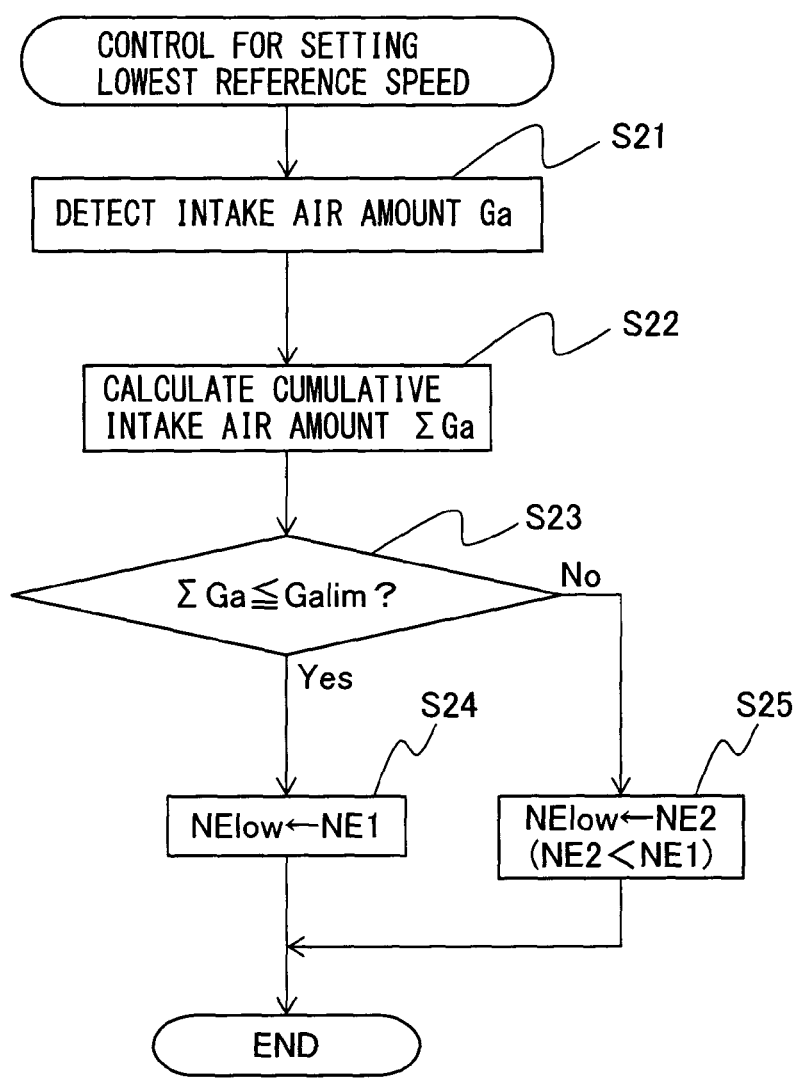
FIG. 11 is a flow chart which shows a control routine of control for setting a lowest reference speed.

FIG. 11 is a flow chart which shows a control routine for control for setting the lowest reference speed NElow in the present embodiment. The illustrated control routine is performed by interruption every certain time interval.

First, at step S21, the intake air amount Ga is detected based on the output of the airflow meter 39. Next, at step S22, the intake air amount Ga which was detected at step S21 is cumulatively added whereby the cumulative intake air amount ΣGa is calculated. Next, at step S23, it is judged if the cumulative intake air amount ΣGa is the limit cumulative intake air amount Galim or less. At step S23, when it is judged that cumulative intake air amount ΣGa is a limit cumulative intake air amount Galim or less, that is, when it is judged that the oxygen storage amount OSAufc of the downstream side exhaust purification catalyst 24 is the limit storage amount Clim or more, the routine proceeds to step S24. At step S24, the lowest reference speed NElow at the conditions for execution of fuel cut control is set to the normal speed NE1 and the control routine is ended.

On the other hand, when, at step S23, it is judged that the cumulative intake air amount ΣGa is greater than the limit cumulative intake air amount Galim, that is, when it is judged that the oxygen storage amount OSAufc of the downstream side exhaust purification catalyst 24 is smaller than the limit storage amount Clim, the routine proceeds to step S25. At step S25, the lowest reference speed NElow in the conditions for execution of fuel cut control is set to a lower speed NE2 which is lower than normal (NE2<NE1) and the control routine is ended.

Note that, in the above two embodiments, the oxygen excess/deficiency which is calculated based on the output air-fuel ratio AFdwn of the downstream side air-fuel ratio sensor 41 or the cumulative intake air amount ΣGa which is calculated based on the output of the airflow meter 39 is used as the basis to estimate the oxygen storage amount OSAufc of the downstream side exhaust purification catalyst 24.

However, the oxygen storage amount OSAufc of the downstream side exhaust purification catalyst 24 may be estimated by another method. For example, it may also be estimated based on the number of times the above-mentioned oxygen storage and release cycle of the upstream side exhaust purification catalyst 20 is executed.

Further, in the above embodiments, as the method of easing the conditions for execution of fuel cut control, the lowest reference speed NElow is lowered. However, as the method for easing the conditions for execution of fuel cut control, not only lowering the lowest reference speed NElow, but also another method may be used.

For example, fuel cut control includes conditions for prohibition which prevent fuel cut control even when the conditions for execution based on the engine speed and the engine load are satisfied. When easing the conditions for execution of fuel cut control, it is also possible to ease the conditions for prohibiting this fuel cut control. For example, as a condition for prohibition of fuel cut control, the condition of prohibiting fuel cut control when the temperature of the engine cooling water is a predetermined limit temperature or less may be enumerated. When easing the conditions for execution of fuel cut control, it is also possible to lower the limit temperature at the prohibiting conditions and make it harder for fuel cut control to be prohibited.

While the invention has been described by reference to specific embodiments chosen for purposes of illustration, it should be apparent that numerous modifications could be made thereto by those skilled in the art without departing from the basic concept and scope of the invention.

REFERENCE SIGNS LIST

1 engine body
5 combustion chamber
7 intake port
9 exhaust port
19 exhaust manifold
20 upstream side exhaust purification catalyst
24 downstream side exhaust purification catalyst
31 ECU
40 upstream side air-fuel ratio sensor
41 downstream side air-fuel ratio sensor

The invention claimed is:

1. A control device of an internal combustion engine, the engine comprising an upstream side exhaust purification catalyst which is provided in an exhaust passage of the internal combustion engine and a downstream side exhaust purification catalyst which is provided in said exhaust passage at the downstream side in the direction of exhaust flow of said upstream side exhaust purification catalyst, said downstream side exhaust purification catalyst containing a variable oxygen storage amount, the control device comprising a storage amount estimating means configured for estimating the oxygen storage amount of said downstream side exhaust purification catalyst, when conditions for execution of a fuel cut, including speed of the engine being a finite lowest reference speed or more, apply, fuel cut control which cuts the feed of fuel to the combustion chamber during operation of the internal combustion engine is configured to be executed, and when an oxygen storage amount estimated by said storage amount estimating means becomes a given limit oxygen storage amount or less, said control device is configured for lowering said lowest reference speed of said fuel cut execution conditions compared to when the oxygen storage amount is greater than said limit oxygen storage amount.

2. The control device of the internal combustion engine according to claim 1, further comprising a downstream side air-fuel ratio sensor which is provided at the downstream side in the direction of flow of exhaust from said upstream side exhaust purification catalyst and at the upstream side in the direction of flow of exhaust from said downstream side exhaust purification catalyst, wherein said storage amount estimating means is configured for estimating the oxygen storage amount of the downstream side exhaust purification catalyst based on the output of said downstream side air-fuel ratio sensor.

3. The control device of the internal combustion engine according to claim 1 wherein said storage amount estimating means is configured for estimating that said oxygen storage amount of the downstream side exhaust purification catalyst has become said limit storage amount or less when a cumulative intake air amount from when said previous fuel cut control ends has become a limit air amount or less.

4. The control device of the internal combustion engine according to claim 1, further comprising a downstream side air-fuel ratio sensor which is provided at the downstream side in the direction of flow of exhaust from said upstream side exhaust purification catalyst and at the upstream side in the direction of flow of exhaust from said downstream side exhaust purification catalyst, said control device is configured for performing feedback control so that the air-fuel ratio of the exhaust gas flowing into said upstream side exhaust purification catalyst becomes a target air-fuel ratio and for performing target air-fuel ratio setting control which alternately sets said target air-fuel ratio to a rich set air-fuel ratio which is richer than the stoichiometric air-fuel ratio and a lean set air-fuel ratio which is leaner than the stoichiometric air-fuel ratio, and, in said target air-fuel ratio setting control, when the air-fuel ratio detected by said downstream side air-fuel ratio sensor has become a rich judgment air-fuel ratio, which is richer than the stoichiometric air-fuel ratio, or less, said control device is configured for switching said target air-fuel ratio to the lean set air-fuel ratio.

5. The control device of the internal combustion engine according to claim 2 wherein said control device is configured for performing feedback control so that the air-fuel ratio of the exhaust gas flowing into said upstream side exhaust purification catalyst becomes a target air-fuel ratio and for performing target air-fuel ratio setting control which alternately sets said target air-fuel ratio to a rich set air-fuel ratio which is richer than the stoichiometric air-fuel ratio and a lean set air-fuel ratio which is leaner than the stoichiometric air-fuel ratio, and, in said target air-fuel ratio setting control, when the air-fuel ratio detected by said downstream side air-fuel ratio sensor has become a rich judgment air-fuel ratio, which is richer than the stoichiometric air-fuel ratio, or less, said control device is configured for switching said target air-fuel ratio to the lean set air-fuel ratio.

6. The control device of the internal combustion engine according to claim 4, wherein in said target air-fuel ratio setting control, when the oxygen storage amount of said upstream side exhaust purification catalyst has become a given switching reference storage amount, which is smaller than a maximum storable oxygen amount, or more, said target air-fuel ratio is said control device is configured for switching to the rich set air-fuel ratio.

7. The control device of the internal combustion engine according to claim 3, further comprising a downstream side air-fuel ratio sensor which is provided at the downstream side in the direction of flow of exhaust from said upstream side exhaust purification catalyst and at the upstream side in the direction of flow of exhaust from said downstream side exhaust purification catalyst, said control device is configured for performing feedback control so that the air-fuel ratio of the exhaust gas flowing into said upstream side exhaust purification catalyst becomes a target air-fuel ratio and for performing target air-fuel ratio setting control which alternately sets said target air-fuel ratio to a rich set air-fuel ratio which is richer than the stoichiometric air-fuel ratio and a lean set air-fuel ratio which is leaner than the stoichiometric air-fuel ratio, and, in said target air-fuel ratio setting control, when the air-fuel ratio detected by said downstream side air-fuel ratio sensor has become a rich judgment air-fuel ratio, which is richer than the stoichiometric air-fuel ratio, or less, said control device is configured for switching said target air-fuel ratio to the lean set air-fuel ratio.

8. The control device of the internal combustion engine according to claim 5, wherein in said target air-fuel ratio setting control, when the oxygen storage amount of said upstream side exhaust purification catalyst has become a given switching reference storage amount, which is smaller than a maximum storable oxygen amount, or more, said target air-fuel ratio is said control device is configured for switching to the rich set air-fuel ratio.

9. The control device of the internal combustion engine according to claim 7, wherein in said target air-fuel ratio setting control, when the oxygen storage amount of said upstream side exhaust purification catalyst has become a given switching reference storage amount, which is smaller than a maximum storable oxygen amount, or more, said target air-fuel ratio is said control device is configured for switching to the rich set air-fuel ratio.

* * * * *